United States Patent
Idehara

(10) Patent No.: US 9,747,063 B2
(45) Date of Patent: Aug. 29, 2017

(54) PRINT APPARATUS AND NON-TRANSITORY COMPUTER-READABLE RECORDING MEDIUM FOR PRINTING CONFIDENTIALLY

(71) Applicant: Konica Minolta, Inc., Chiyoda-ku, Tokyo (JP)

(72) Inventor: Takenori Idehara, Sagamihara (JP)

(73) Assignee: KONICA MINOLTA, INC., Chiyoda-Ku, Tokyo (JP)

(*) Notice: Subject to any disclaimer, the term of this patent is extended or adjusted under 35 U.S.C. 154(b) by 0 days.

(21) Appl. No.: 15/183,510

(22) Filed: Jun. 15, 2016

(65) Prior Publication Data
US 2016/0371040 A1 Dec. 22, 2016

(30) Foreign Application Priority Data
Jun. 19, 2015 (JP) ................................. 2015-124028

(51) Int. Cl.
G06F 3/12 (2006.01)
H04N 1/44 (2006.01)
H04N 1/00 (2006.01)

(52) U.S. Cl.
CPC .......... *G06F 3/1238* (2013.01); *G06F 3/1212* (2013.01); *G06F 3/1222* (2013.01); *G06F 3/1267* (2013.01); *H04N 1/00204* (2013.01); *H04N 1/4406* (2013.01); *H04N 2201/006* (2013.01); *H04N 2201/0094* (2013.01)

(58) Field of Classification Search
None
See application file for complete search history.

(56) References Cited

U.S. PATENT DOCUMENTS

2010/0005526 A1* 1/2010 Tsuji ................... G06F 21/35
726/21
2016/0234401 A1* 8/2016 Tsuzuki ............... H04N 1/4413

FOREIGN PATENT DOCUMENTS

JP 2009-075833 A 4/2009
JP 2009-234106 A 10/2009

* cited by examiner

*Primary Examiner* — Thomas D Lee
(74) *Attorney, Agent, or Firm* — Buchanan Ingersoll & Rooney PC

(57) ABSTRACT

Disclosed is a print apparatus including: a memory configured to store the print job; a print unit configured to execute a print based on the print job; a first detector configured to detect the print allowed user; a second detector configured to detect a print disallowed user; and a hardware processor configured to: obtain the print job, change a danger distance according to a first distance from the print apparatus to the print allowed user, compare the danger distance with a second distance from the print apparatus to the nearest print disallowed user when the first distance is not more than a predetermined print start distance, and instruct the print unit to start the print based on the print job in accordance with a result of the comparison.

26 Claims, 25 Drawing Sheets

PRINT APPARATUS AND NON-TRANSITORY COMPUTER-READABLE RECORDING MEDIUM FOR PRINTING CONFIDENTIALLY

BACKGROUND OF THE INVENTION

Field of the Invention

The present invention relates to a print apparatus and a non-transitory computer-readable recording medium for controlling the print based on the print job which is set by a user who is allowed to print a document (hereinafter, referred to as "print allowed user"), so as to start the print when the print allowed user approaches the print apparatus.

Description of Related Art

In order to prevent the leak of the information due to the situation in which another person carries away or secretly views the printed document which is output by a print apparatus, there is a print apparatus having the following confidential print function. In the above confidential print function, the print allowed user who is allowed to execute a print job is previously set to the print job. In case that the print allowed user is authenticated by an authentication device attached to the print apparatus, the print based on the above print job is stared.

By the confidential print function, the print is carried out in the situation in which the print allowed user is near the print apparatus. Therefore, a confidential printed document can be prevented from being carried away by another person. On the other hand, because the print is started when the print allowed user is authenticated by the authentication device of the print apparatus, the standby time until the finish of the print is longer.

In Japanese Patent Application Publication No. 2009-234106, the following print system is disclosed. In the print system, the approach of a user to a printer is detected and the user is identified by a user detecting mechanism. When a print job which is input by the user who approaches the printer is held in a server, the preparation of the print, such as the reception of the print job from the server, the warm up of the print mechanism, the indication of the print job, and the like is carried out prior to the user authentication process. After the user authentication is carried out in the printer, the print is started.

In the above print system, the preparation of the pint is started when the user approaches the printer. However, in order to prevent the printed document from being carried away or being secretly viewed by another person, the print is started after the user is authenticated in the printer. Therefore, the effect of shortening the standby time until the finish of the print is restrictive.

SUMMARY

To achieve at least one of the abovementioned objects, a print apparatus for printing a document based on a print job set by a print allowed user, which reflects one aspect of the present invention, comprises:

a memory configured to store the print job;

a print unit configured to execute a print based on the print job;

a first detector configured to detect the print allowed user around the print apparatus;

a second detector configured to detect a print disallowed user who is different from the print allowed user around the print apparatus; and a hardware processor configured to:

obtain the print job, change a danger distance according to a first distance which is a distance from the print apparatus to the print allowed user detected by the first detector, compare the danger distance with a second distance which is a distance from the print apparatus to the print disallowed user who exists nearest to the print apparatus among the print disallowed users detected by the second detector when the first distance is not more than a predetermined print start distance, and instruct the print unit to start the print based on the print job in accordance with a result of comparing the danger distance with the second distance.

Preferably, when the hardware processor judges that the second distance is more than the danger distance, the hardware processor instructs the print unit to start the print based on the print job.

Preferably, the danger distance is obtained by subtracting a certain distance from the first distance.

Preferably, the certain distance is obtained by multiplying a moving speed of the print allowed user by a time since the print is started until a first page of the document is discharged.

Preferably, the print apparatus further comprises:

a concealment unit configured to execute a concealment process for concealing a printed document so as not to be viewed from an outside, wherein after the print based on the print job is started, when the second distance is not more than the danger distance, the hardware processor instructs the concealment unit to start the concealment process.

Preferably, the print apparatus further comprises:

a concealment unit configured to execute a concealment process for concealing a printed document so as not to be viewed from an outside, wherein after the print based on the print job is started, when the second distance is not more than the danger distance and the second distance is not more than a predetermined limited distance, the hardware processor instructs the concealment unit to start the concealment process.

Preferably, the limited distance is a distance by which the print disallowed user can move during a time required to execute the concealment process.

Preferably, the hardware processor determines the danger distance in accordance with a distance by which the print disallowed user can move during a time which is necessary for the print allowed user to move by the first distance.

Preferably, the hardware processor determines the danger distance in consideration of a relation between a direction in which a discharge tray is provided from the print apparatus and a position of the print disallowed user who exists nearest to the print apparatus.

Preferably, the hardware processor corrects the second distance to a distance corresponding to a case in which the print disallowed user approaches the print apparatus so as to avoid an obstacle provided near the print apparatus, in accordance with information relating to the obstacle.

Preferably, in case that a dead angle range is caused in a detection area of the second detector, when the print disallowed user who satisfies a condition in which the second distance is not more than the danger distance is not detected at a timing at which the first distance is not more than the print start distance, the hardware processor instructs the print unit to wait for the print based on the print job until a predetermined time elapses, and only in case that the print disallowed user is not detected by the second detection unit until the predetermined time elapses, the hardware processor instructs the print unit to start the print based on the print job.

Preferably, the danger distance is a distance from an outer edge of a danger area which is set around the print apparatus, to the print apparatus, and the hardware processor changes the danger distance by changing the danger area according to the first distance, and the hardware processor compares the danger distance with the second distance by judging whether the print disallowed user exists in the danger area.

BRIEF DESCRIPTION OF THE DRAWINGS

The present invention will become more fully understood from the detailed description given hereinafter and the accompanying drawings given by way of illustration only, and thus are not intended as a definition of the limits of the present invention, and wherein.

DETAILED DESCRIPTION OF PREFERRED EMBODIMENT

Hereinafter, a preferred embodiment of the present invention will be explained with reference to the accompanying drawings.

In order to shorten the standby time until the finish of the print of the confidential document, for example, the following method is considered. In the method, a user who is near the print apparatus is detected by using the wireless technology. In case that the print allowed user who approaches the print apparatus within the predetermined distance from the print apparatus is detected, the print apparatus automatically starts the print based on the print job which is set by the print allowed user.

However, in this method, the security for the confidential document cannot be secured when a print disallowed user who is different from the print allowed user and who is not allowed to print a document, exists near the print apparatus. Therefore, for example, the area which is within the radius of 10 meters from the print apparatus is determined as the danger area. When a print disallowed user exists in the danger area, the print may be prohibited from being started even though the print allowed user approaches the print apparatus within the predetermined distance. However, in this case, the inventor finds the following problem.

That is, even in case that the print is prohibited from being automatically started because a print disallowed user exists in the danger area when the print allowed user approaches the print apparatus within the predetermined area, it is possible to secure the security for the output document by the print allowed user when the print allowed user further approaches the print apparatus nearer to the print apparatus than a print disallowed user exists. However, in this method, the print is not automatically started, and the standby time cannot be shortened.

Therefore, one of the objects of this embodiment is to provide a print apparatus in which the standby time until the finish of the print can be shortened while the security for the print document is secured.

Figure 1:
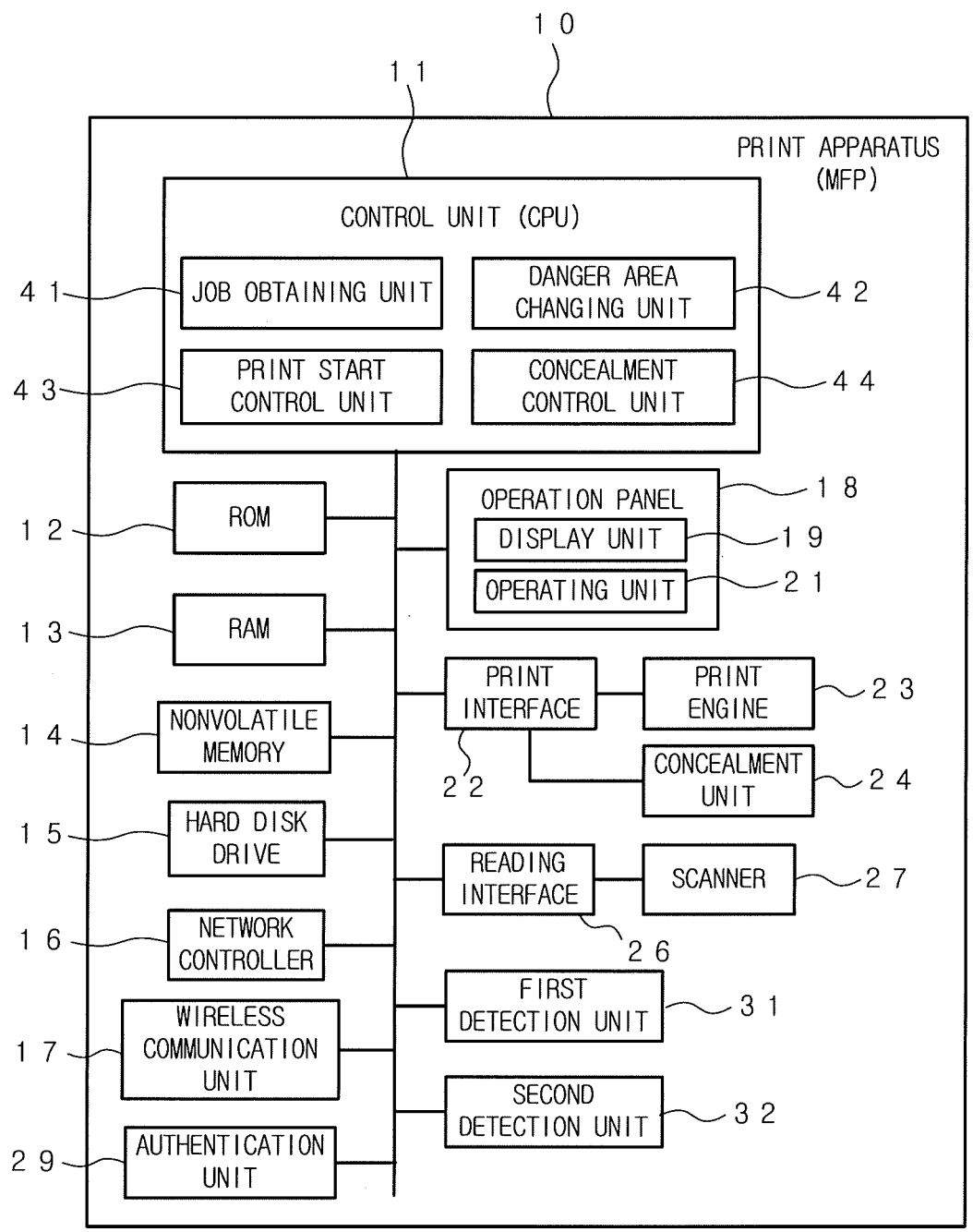
FIG. 1 is a block diagram showing a schematic configuration of the print apparatus according to the embodiment.

FIG. 1 shows a block diagram showing the schematic configuration of the print apparatus 10 according to the embodiment. The print apparatus 10 is a so-called multi function peripheral which has a copy function for printing an image of an original on a recording sheet by optically reading the original, a scan function for storing the image data of the read original as a file or transmitting the file to an external terminal via the network, a print function for printing out a document or an image on a recording sheet in accordance with the print job received from the external terminal, and the like. Hereinafter, the print apparatus 10 is also referred to as MFP.

The print apparatus 10 receives the print job (hereinafter, referred to as the authentication print job) which is set by the print allowed user from an external terminal 4 (See FIG. 2), such as a PC (Personal Computer), and stores the received authentication print job. The print apparatus 10 automatically starts the print based on the authentication print job when it is confirmed that the security for the printed document can be secured in the situation in which the print allowed user approaches the print apparatus 10 and a print disallowed user who is different from the print allowed user does not exist near the print apparatus 10 (for example, the print disallowed user does not exist nearer to the print apparatus than the print allowed user).

The print apparatus 10 comprises a CPU (Central Processing Unit) 11 (hardware processor) for entirely controlling the operation of the print apparatus 10. The CPU 11 is connected with a ROM (Read Only Memory) 12, a RAM (Random Access Memory) 13, a nonvolatile memory 14, a hard disk drive 15 (memory), a network controller 16, a wireless communication unit 17, an operation panel 18, a print interface 22, a reading interface 26, an authentication unit 29, a first detection unit 31 (first detector), a second detection unit 32 (second detector) and the like. The print interface 22 is connected with a print engine 23 (print unit) and a concealment unit 24. The reading interface 26 is connected with a scanner 27.

By the CPU 11, a middleware, application programs and the like are executed on an OS (Operating System) program as a base.

In the ROM 12, various types of programs are stored. By executing various types of processes by the CPU 11 in accordance with these programs, each function of the print apparatus 10 is realized.

The RAM 13 is used as a work memory for temporarily storing various data when the CPU 11 executes the process in accordance with the programs.

In the nonvolatile memory 14, various types of settings are stored. In the hard disk drive 15, various types of programs, the received security job and the like are stored.

The network controller 16 transmits and receives data to/from an external device via a wired or wireless network, such as a LAN (Local Area Network) or the like. The network controller 16 receives an authentication print job from an external terminal, such as a PC. The wireless communication unit 17 transmits and receives data to/from an external device via a near field radio communication, such as Bluetooth® or the like.

The operation panel 18 comprises a display unit 19 and an operating unit 21. The display unit 19 comprises a liquid crystal display (LCD) and the like, and has a function for displaying various types of operation windows, setting windows and the like. The operating unit 21 comprises various types of operation switches, such as a start button and the like, and a touch panel provided on the physical screen of the display unit 19. The touch panel detects the coordinate position on which the physical screen of the display unit 19 is pressed down by using a touch pen, the user's finger or the like. Further, the touch panel detects the flick operation, the drag operation, the operation for the scroll bar, and the like.

The print engine 23 connected with the print interface 22 functions as the print unit for forming an image on the recording sheet in accordance with the print data. In this embodiment, the print engine 23 is configured as a so-called laser printer which comprises a conveying device for the recording sheet, a photoconductive drum, a charging device, a laser unit, a developing device, a transfer and separation device, a cleaning device and a fixing device, and which forms an image by the electrophotographic process. The print engine 23 may be another type of printer.

The concealment unit 24 has the function for concealing the printed document output by the print engine 23 from the outside. For example, the concealment unit 24 comprises an intermediate tray which cannot be seen from the outside, such as a finisher or the like. The printed document is stored in the intermediate tray in order to stop the discharge of the printed document to the outside. Alternatively, by containing the printed document mounted on the discharge tray in the containing box in which the inside thereof cannot be seen, the printed document cannot be viewed from the outside. In case that the concealment unit 24 does not comprise the intermediate tray or the containing box, the concealment unit 24 stops the print before a print disallowed user approaches the print apparatus 10. In case of the double-sided printing, after the print is stopped, by discharging the blank sheet, the discharged printed document is not viewed from the outside. The concealment unit 24 may conceal the printed document by using an optional method for hiding the printed document so as not be visually recognized from the outside.

The reading interface 26 is connected with a scanner 27 having the function for obtaining the image data by optically reading an original. For example, the scanner 27 comprises a light source for irradiating an original with light, a line image sensor for reading the original line by line in the width direction of the original by receiving the reflected light from the original, a moving unit for sequentially moving the reading position line by line in the longitudinal direction of the original, an optical system having lenses, mirrors and the like for guiding the reflected light from the original to the line image sensor and focusing the reflected light on the line image sensor, a converting unit for converting an analog image signal outputted from the line image sensor into digital image data, and the like.

The authentication unit 29 executes the user authentication. The authentication unit 29 executes the user authentication by receiving a password and a user ID from the operation panel 18. Alternatively, the authentication unit 29 may execute the user authentication by using an optional method, for example, by receiving the user information from an RFID (Radio Frequency Identification) card in which the user information is registered. Further, the authentication unit 29 authenticates a user detected by the first detection unit 31 or the second detection unit 32 which will be explained later.

The first detection unit 31 has the function for detecting the print allowed user who exists around the print apparatus 10. The first detection unit 31 recognizes at least the distance between the print apparatus 10 and the print allowed user. Preferably, the first detection unit 31 further detects the direction from the print apparatus 10 to the print allowed user or the absolute position of the print allowed user, such as the longitude and the latitude of the place at which the print allowed user exists. The second detection unit 32 has the function for detecting a user who is different from the print allowed user and who is not allowed to print a document (referred to as "print disallowed user") and who exists around the print apparatus 10. The second detection unit 32 recognizes at least the distance between the print apparatus 10 and a print disallowed user. Preferably, the second detection unit 32 further detects the direction from the print apparatus 10 to the print disallowed user or the absolute position of the print disallowed user, such as the longitude and the latitude of the place at which the print disallowed user exists.

Figure 2:
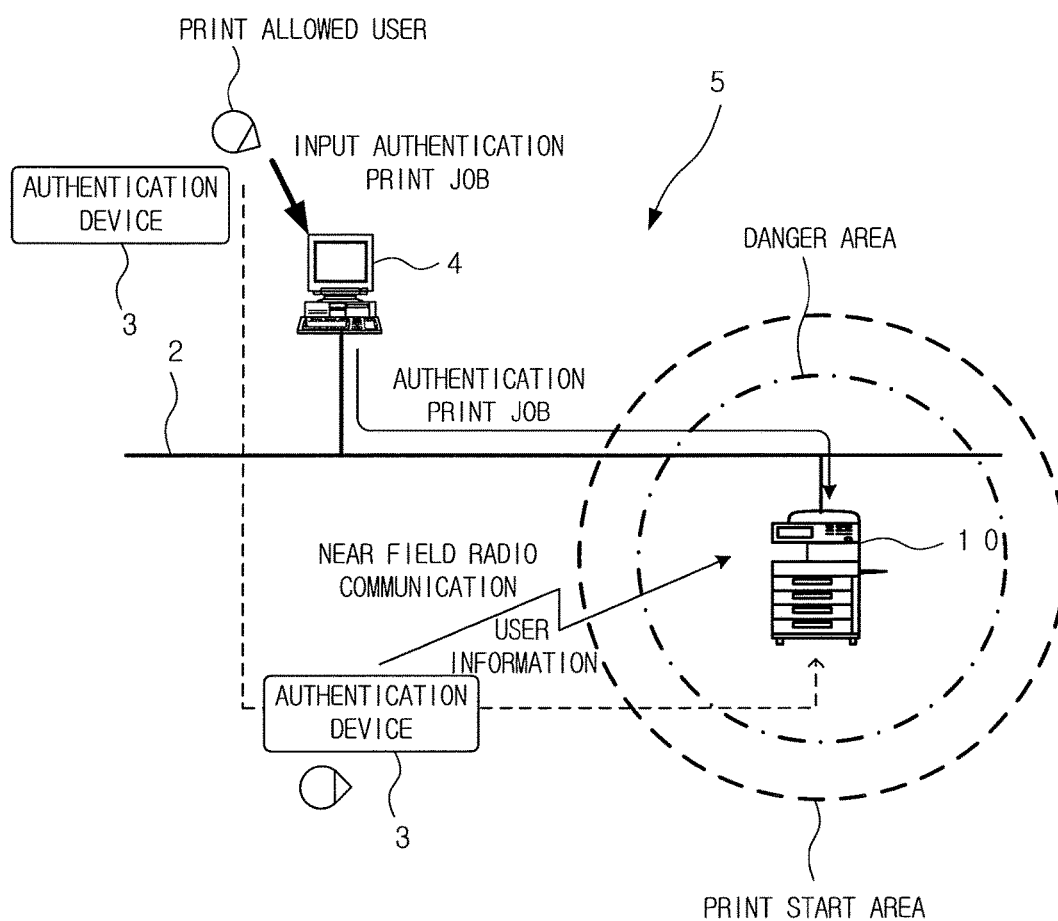
FIG. 2 is a view showing a configuration example of the print system including the print apparatus according to the embodiment.

For example, as shown in FIG. 2, the first detection unit 31 receives the user information from the authentication device 3 by communicating with the authentication device 3 of each user via the near field radio communication. The first detection unit 31 identifies the user from the received user information and judges whether the user is the print allowed user.

Figure 3:
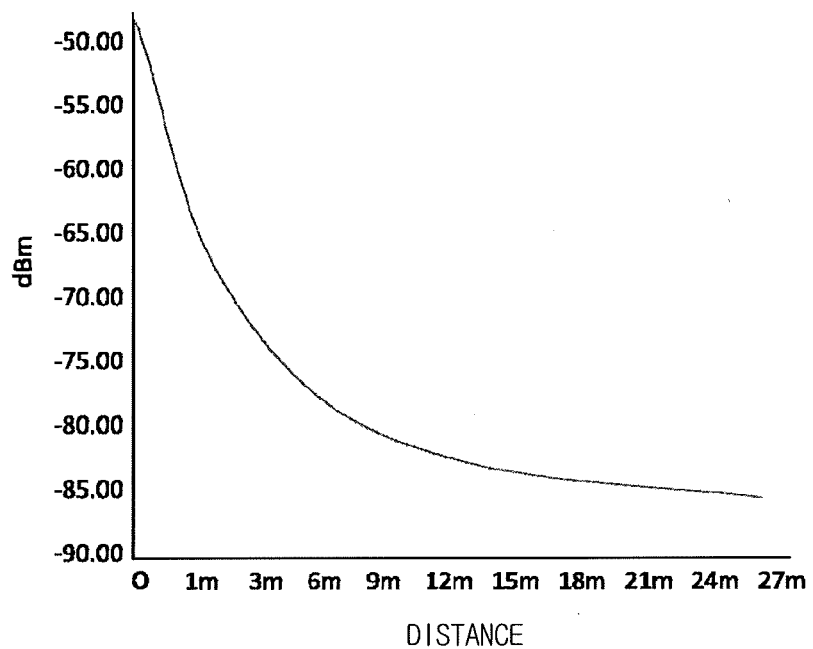
FIG. 3 is a characteristic diagram showing the relation between the distance and the radio wave intensity.

The distance between the print apparatus 10 and the detected authentication device 3 is estimated in accordance with the intensity of the radio wave received from the authentication device 3. FIG. 3 is an example of the characteristic diagram showing the relation between the distance and the radio wave intensity. By converting the intensity of the radio wave received from the authentication device 3 to the distance in accordance with the characteristic diagram shown in FIG. 3, the first detection unit 31 detects the distance between the authentication device 3 and the print apparatus 10.

The second detection unit 32 detects a print disallowed user by the same method as the first detection unit 31, or detects the print disallowed user by a human sensor or the like.

In case of the print system 5 shown in FIG. 2, when a user inputs an authentication print job to the PC terminal 4, the authentication print job including the information of the print allowed user is transmitted to the print apparatus 10 via the network 2, such as LAN. The print apparatus 10 receives and stores the authentication print job. The print allowed user carries the authentication device 3 and moves toward the place at which the print apparatus 10 is installed. When the authentication device 3 enters the detection area of the first detection unit 31, the distance between the authentication device 3 (the print allowed user) and the print apparatus 10 is detected by the first detection unit 31.

The print apparatus 10 sets the danger distance. When a print disallowed user exists within the danger distance from the print apparatus 10, it is judged that the security for the printed document is influenced. The danger distance is successively changed according to the distance between the print apparatus 10 and the print allowed user, which is detected by the first detection unit 31. When the distance between the print apparatus 10 and the print allowed user is within the predetermined print start distance, the print apparatus 10 compares the distance between the print apparatus 10 and the print disallowed user who exists nearest to the print apparatus 10 (referred to as the nearest print disallowed user) among the print disallowed users detected by the second detection unit 32, with the danger distance. Then, in accordance with the result of the above comparison, the CPU 11 judges whether to control the print apparatus 10 so as to start the print based on the authentication print job. For example, when the distance between the print apparatus 10 and the nearest print disallowed user is not less than the danger distance, the print based on the authentication print job is started. When the distance between the print apparatus 10 and the nearest print disallowed user is less than the danger distance, the CPU 11 controls the print apparatus 10 so as not to start the print based on the authentication print job.

The print start distance is the standard for allowing the print based on the authentication print job to be started in case that the security for the printed document is secured when the print allowed user approaches the print apparatus 10 within the print start distance from the print apparatus 10. The danger distance is the standard for judging that the security for the printed document is influenced when the print disallowed user exists within the danger distance from the print apparatus 10.

Figure 4:
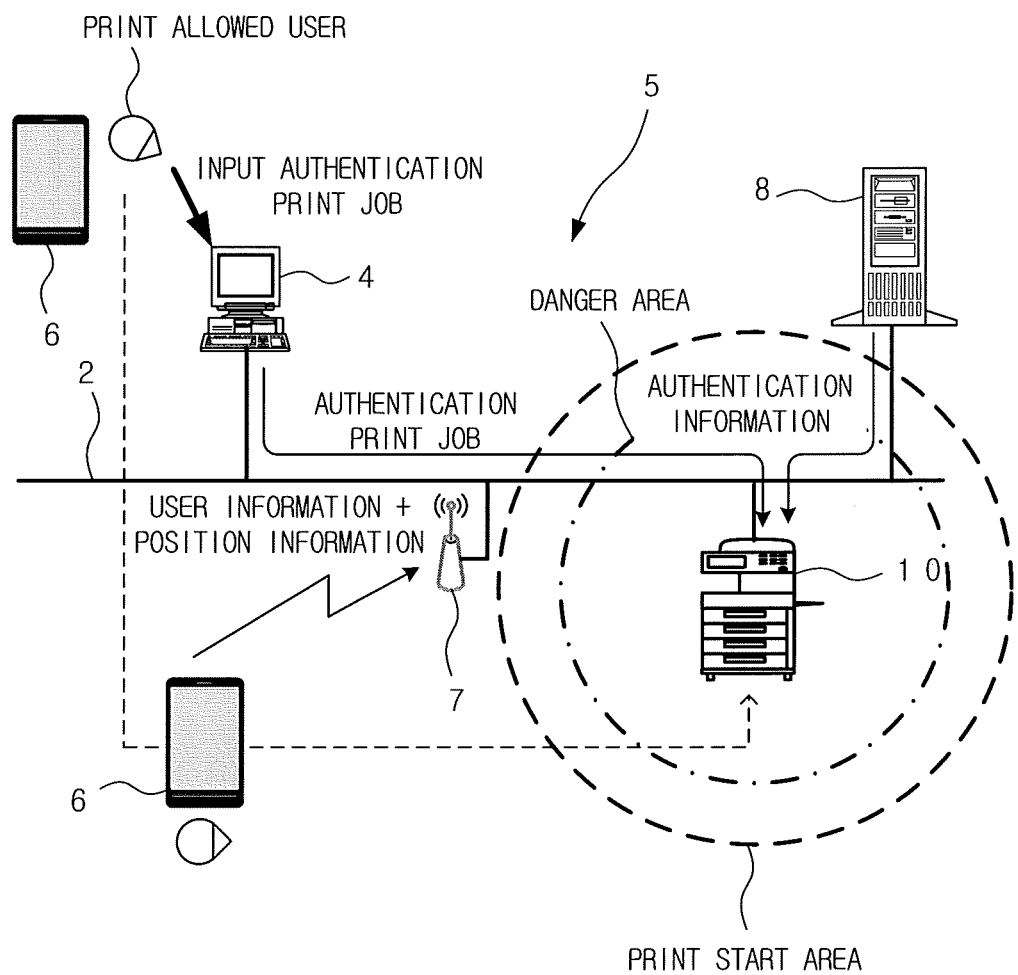
FIG. 4 is a view showing another example of the configuration of the print system including the print apparatus according to the embodiment.

FIG. 4 shows another example of the configuration of the print system 5 according to the embodiment. In the configuration shown in FIG. 4, a user carries a portable information terminal 6, such as a smart phone having the GPS (Global Positioning System) function, and the position of the user is recognized by receiving the user information and the position information from the portable information terminal 6. When the user inputs the authentication print job to the PC terminal 4, the authentication print job including the information of the print allowed user is transmitted to the print apparatus 10 via the network 2, such as LAN. The print apparatus 10 receives and stores the authentication print job.

The print allowed user carries the portable information terminal 6 and moves toward the place at which the print apparatus 10 is installed. The portable information terminal 6 is connected with the network 2 by wirelessly communicating with the access point 7. The portable information terminal 6 transmits the position information and the user information to the print apparatus 10. The first detection unit 31 of the print apparatus 10 recognizes the distance between the print apparatus 10 and the portable information terminal 6 as the distance between the print apparatus 10 and the print allowed user in accordance with the position information received from the portable information terminal 6 and the position information of the print apparatus 10. Further, the print apparatus 10 executes the user authentication by checking the user information received from the portable information terminal 6 and the authentication information obtained from the authentication server 8 on the network 2.

The print apparatus 10 successively changes the danger distance according to the distance between the print apparatus 10 and the print allowed user. When the distance between the print apparatus 10 and the print allowed user is within the print start distance, the print apparatus 10 compares the distance between the print apparatus 10 and the nearest print disallowed user, which is detected by the second detection unit 32, with the danger distance. Then, in accordance with the result of the above comparison, the CPU 11 judges whether to control the print apparatus 10 so as to start the print based on the authentication print job.

Figure 5:
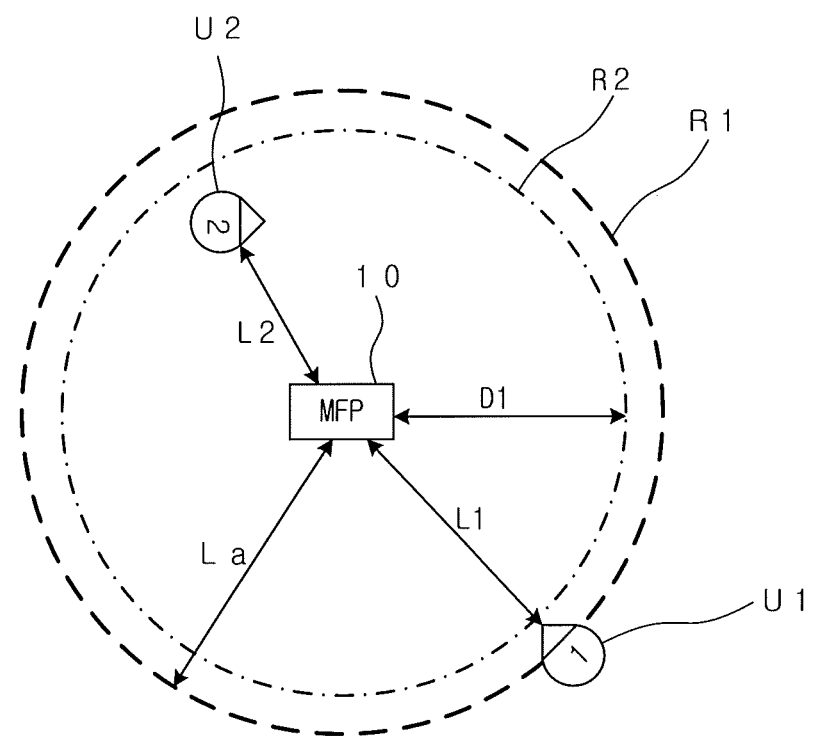
FIG. 5 is a view showing an example of the print start distance La, the danger distance D1, the distance L1 from the print apparatus to the print allowed user, and the distance L2 from the print apparatus to the nearest print disallowed user.

FIG. 5 shows an example of the print start distance La, the danger distance D1, the distance L1 from the print apparatus 10 to the print allowed user U1, and the distance L2 from the print apparatus 10 to the nearest print disallowed user U2. In this case, the area enclosed by the circle having the center at the print apparatus 10 and having the radius which is the print start distance La is the print start area R1. Further, the area enclosed by the circle having the center at the print apparatus 10 and having the radius which is the danger distance D1 is the danger area R2. The danger distance D1 is successively changed according to the distance L1 from the print apparatus 10 to the print allowed user U1.

Whether the distance L1 from the print apparatus 10 to the print allowed user is not more than the print start distance La is judged by judging whether the print allowed user U1 exists within the print start area R1. The comparison between the distance L2 from the print apparatus 10 to the nearest print disallowed user U2 and danger distance D1 is carried out by judging whether the nearest print disallowed user U2 exists within the danger area R2.

The print start distance La and the danger distance D1 may be set according to the number of pages to be printed based on the authentication print job, the print speed of the print apparatus 10, or the like. The danger distance D1 which is set when the print allowed user U1 approaches the print apparatus 10 within the print start distance La may be the same as the print start distance L1, or may be different from the print start distance L1.

The CPU 11 functions as each of the job obtaining unit 41, the danger area changing unit 42, the print start control unit 43 and the concealment control unit 44 (See FIG. 1). The job obtaining unit 41 obtains the authentication print job from the PC terminal 4 or the like. The danger area changing unit 42 changes the danger area R2 (danger distance D1) according to the distance L1 from the print apparatus 10 to the print allowed user. The print start control unit 43 controls the start of the print based on the authentication print job of the print allowed user U1 according to whether the print disallowed user U2 exists within the danger area R2 (according to the result of the comparison between the danger distance D1 and the distance L2 from the print apparatus 10 to the nearest print disallowed user) when the print allowed user exists within the print start area (in case that the distance L1 from the print apparatus 10 to the print allowed user is not more than the print start distance La). The concealment control unit 44 controls the execution of the concealment process by the concealment unit 24.

In the situation of FIG. 5, the print based on the authentication print job of the print allowed user U1 is not started because the print disallowed user U2 exists within the danger area R2 when the print allowed user U1 reaches the print start area R1. If the print disallowed user U2 does not exist within the danger area R2 when the print allowed user U1 enters the print start area R1, the print based on the authentication print job of the print allowed user U1 is automatically started.

Figure 6:
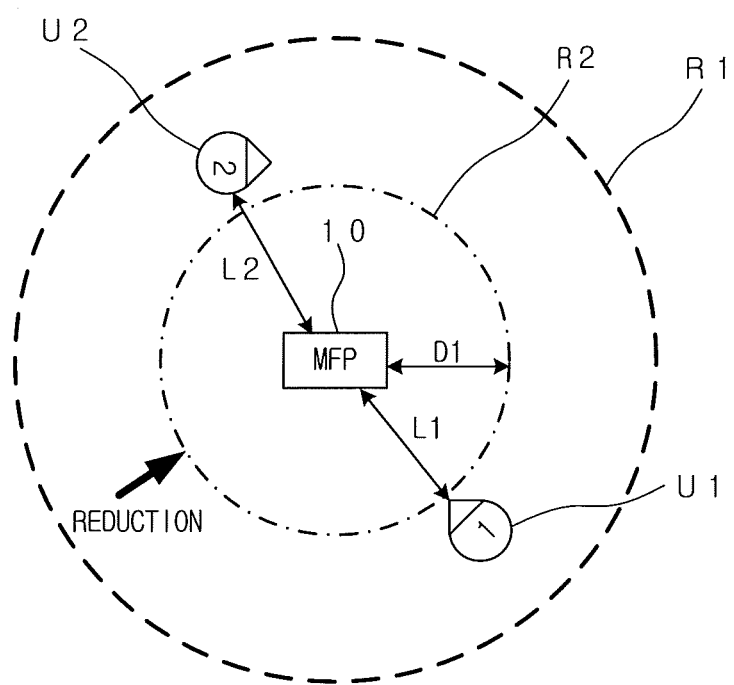
FIG. 6 is a view showing an example of the situation in which the print allowed user U1 approaches the print apparatus closer than that of FIG. 5.

FIG. 6 shows an example of the situation in which the print allowed user U1 approaches the print apparatus 10 closer than that of FIG. 5. By shortening the distance L1 from the print apparatus 10 to the print allowed user U1, the danger distance D1 is changed so as to be shortened (the danger area R2 is reduced). As shown in FIG. 6, by reducing the danger area R2, in case that the print disallowed user U2 does not exist within the danger area R2, the print based on the authentication print job of the print allowed user U1 is automatically started at this time.

Figure 7:
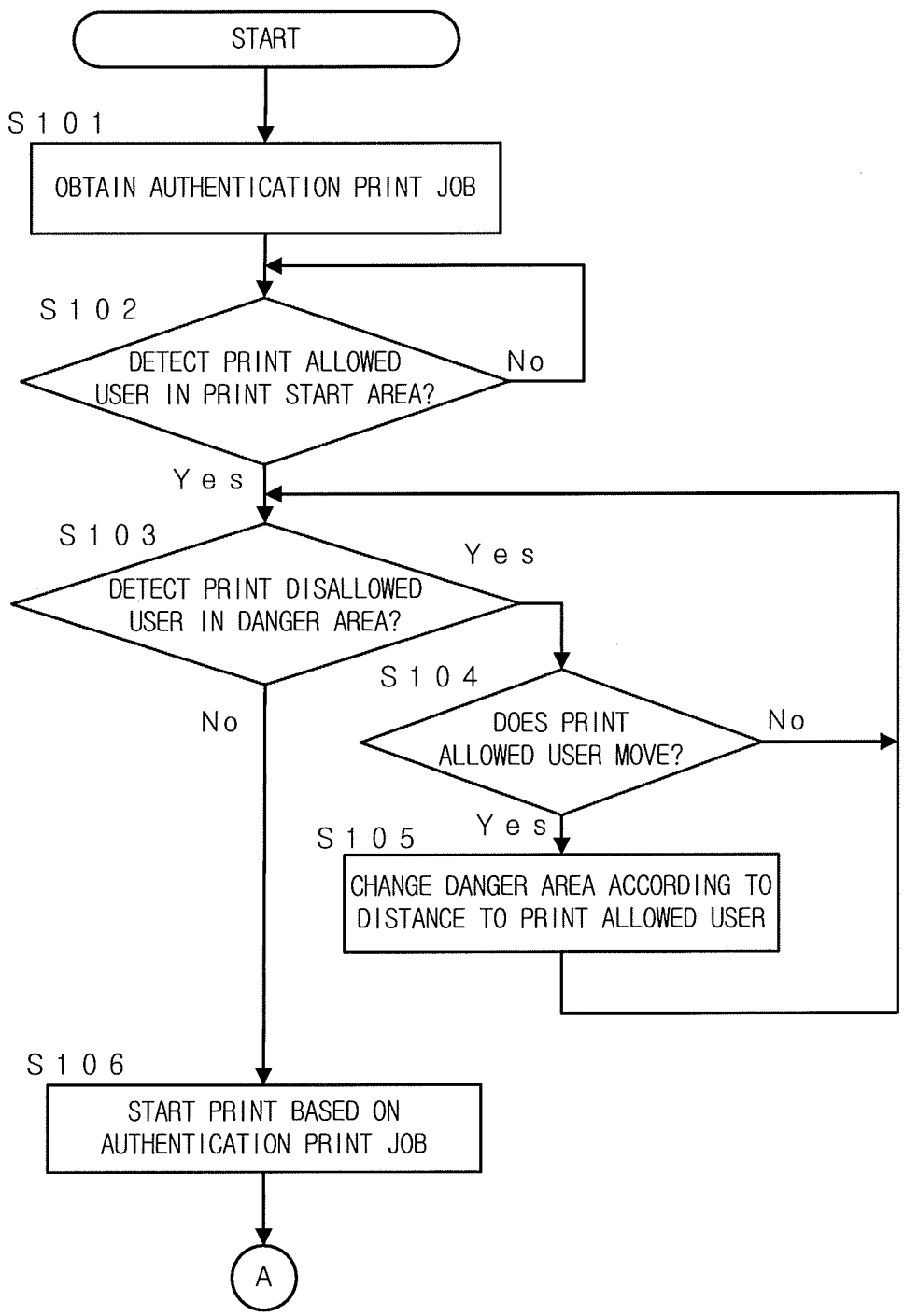
FIG. 7 is a flowchart showing the process relating to the automatic print based on the authentication print job, which is carried out by the print apparatus.

FIG. 7 shows the process relating to the automatic print based on the authentication print job, which is carried out by the print apparatus 10. When the print apparatus 10 receives the authentication print job from the external PC terminal 4 or the like (Step S101), the print apparatus 10 stores the received authentication print job in the hard disk drive 15 thereof, or the like. Then, the print apparatus 10 starts the detection of the print allowed user U1 who sets the authentication print job, and judges whether the print allowed user U1 enters the print start area R1 (Step S102).

When the print allowed user U1 who enters the print start area R1 is detected (Step S102; Yes), it is checked whether the print disallowed user U2 is detected in the danger area R2 (Step S103). In case that the print disallowed user U2 does not exist within the danger area R2 (Step S103; No), the print based on the authentication print job is started (Step S106).

In case that the print disallowed user U2 is detected in the danger area R2 (Step S103; Yes), it is judged whether the print allowed user U1 moves (Step S104). In case that the print allowed user U1 does not move (Step S104; No), the process is continued by returning to Step S103. In case that the print allowed user U1 moves (Step S104; Yes), after the danger distance D1 (the danger area R2) is changed according to the current distance L1 from the print apparatus 10 to the print allowed user U1 (Step S105), the process is continued by returning to Step S103. As the distance L1 is shortened, the danger distance D1 is shortened (the danger area R2 is reduced).

Next, the case in which the danger distance D1 is set in accordance with the time required to print the first page by the print apparatus 10, will be explained.

Even thought the print based on the authentication print job is started, the print apparatus 10 requires a certain amount of time (referred to as the initial discharge time) until the first page is discharged to the discharge tray. Therefore, it is sufficient to set the danger distance D1 in accordance with the distance obtained by subtracting the distance by which the print allowed user U1 is expected to approach the print apparatus 10 during the initial discharge time, from the distance L1 from the print apparatus 10 to the print allowed user U1.

Figure 8:
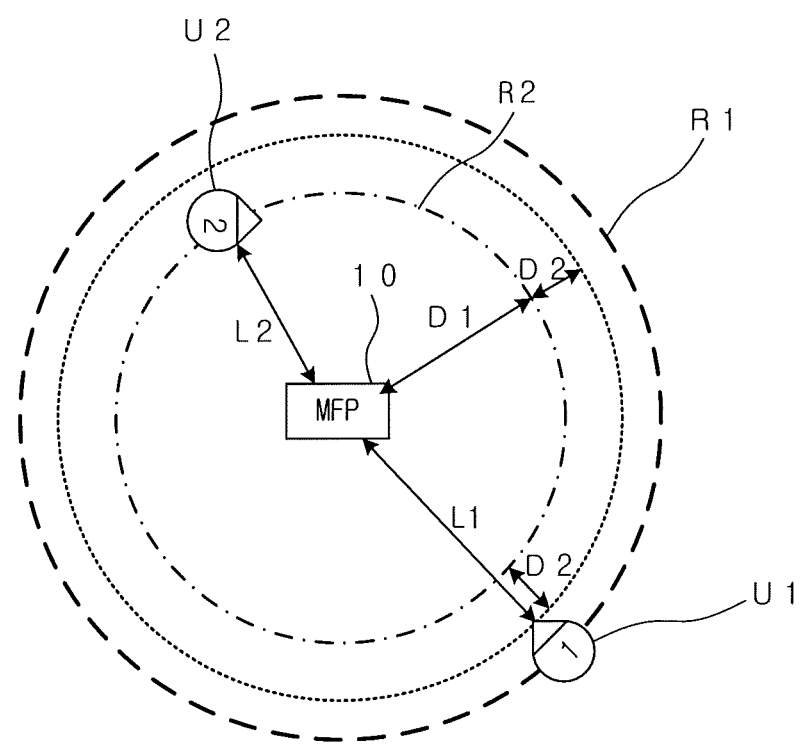
FIG. 8 is a view showing an example in which the danger distance D1 is set by shortening the distance L1 from the print apparatus to the print allowed user by the certain distance D2.

For example, in case that the danger distance D1 is set to the distance which is equal to the distance L1 from the print apparatus to the print allowed user U1 without considering the initial discharge time, the danger distance D1 to be obtained by considering the initial discharge time is set to the distance (L1−D2) obtained by subtracting the distance (the correction distance D2) by which the print allowed user U1 moves during the initial discharge time, from the distance L1 (See FIG. 8).

In case that the walking speed of a general user is 1.0 m/s and the initial discharge time is 5 seconds, the correction distance D2 becomes 5 meters. Further, the walking speed of the print allowed user U1 may be measured and the correction distance D2 may be calculated in accordance with the measured walking speed. For example, in case that the actual walking speed of the print allowed user U1 is 0.5 m/s, the correction distance D2 becomes 2.5 meters. In case that the walking speed of the print allowed user U1 is momentarily changed, the correction distance D2 may be changed by repeating the above calculation.

Figure 9:
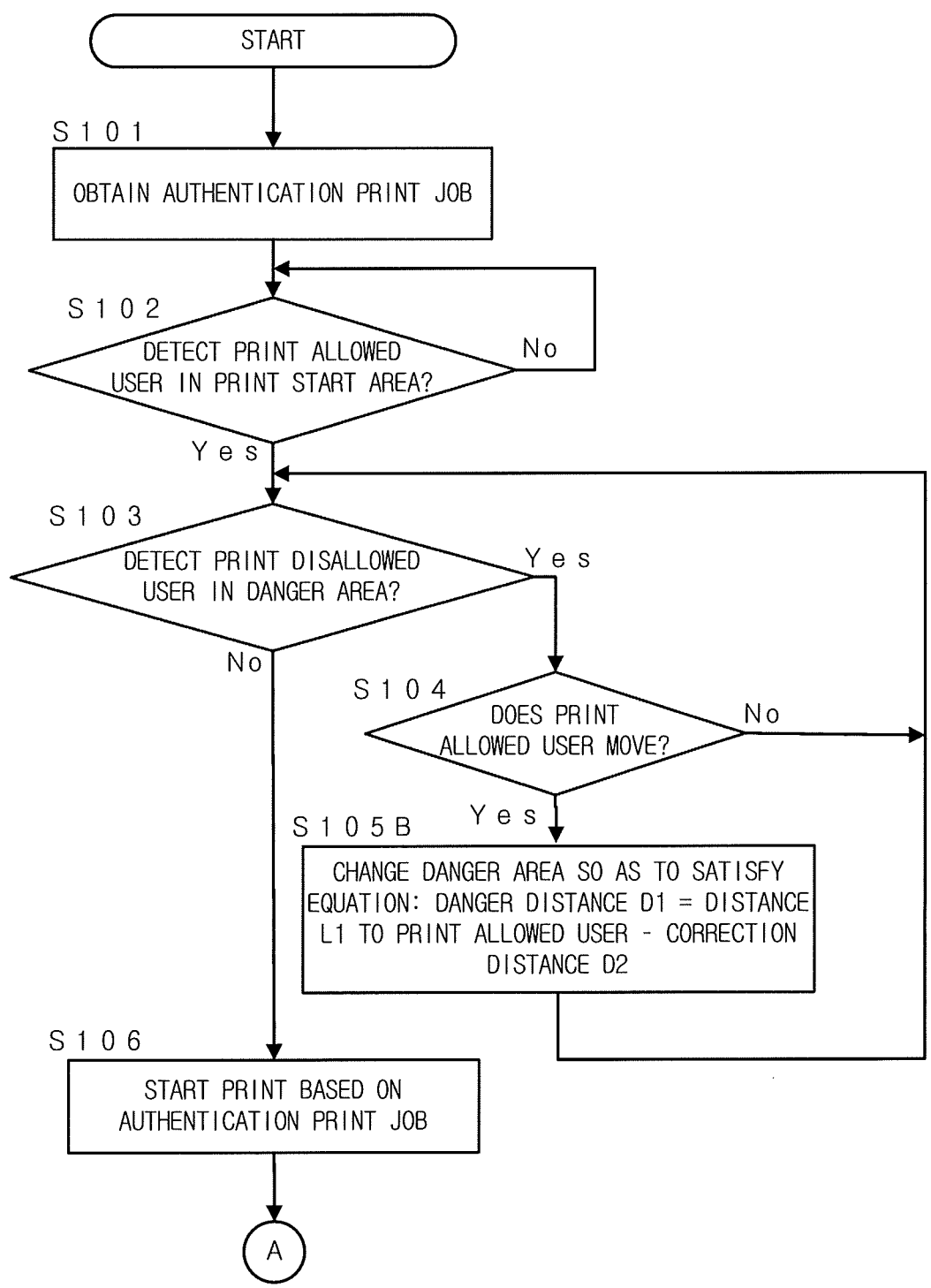
FIG. 9 is a flowchart showing the process which relates to the automatic print based on the authentication print job and which is carried out in case that the danger distance D1 is set in consideration of the initial discharge time.

FIG. 9 shows the process which is carried out in case that the danger distance D1 is set in consideration of the initial discharge time. The steps which are the same as those of FIG. 7 are denoted by the same step numbers, and the explanation thereof are suitably omitted. In the process shown in FIG. 9, instead of Step S105, Step 105B is executed. That is, the distance obtained by subtracting the curtain distance (correction distance D2) from the distance L1 from the print apparatus 10 to the print allowed user U1 is set to the danger distance D1, and the area enclosed by the circle having the center at the print apparatus 10 and having the radius which is the danger distance D1 is set to the danger area R2.

Next, the case in which the print based on the authentication print job is automatically started, but is stopped due to the approach of the print disallowed user, will be explained.

Figure 10:
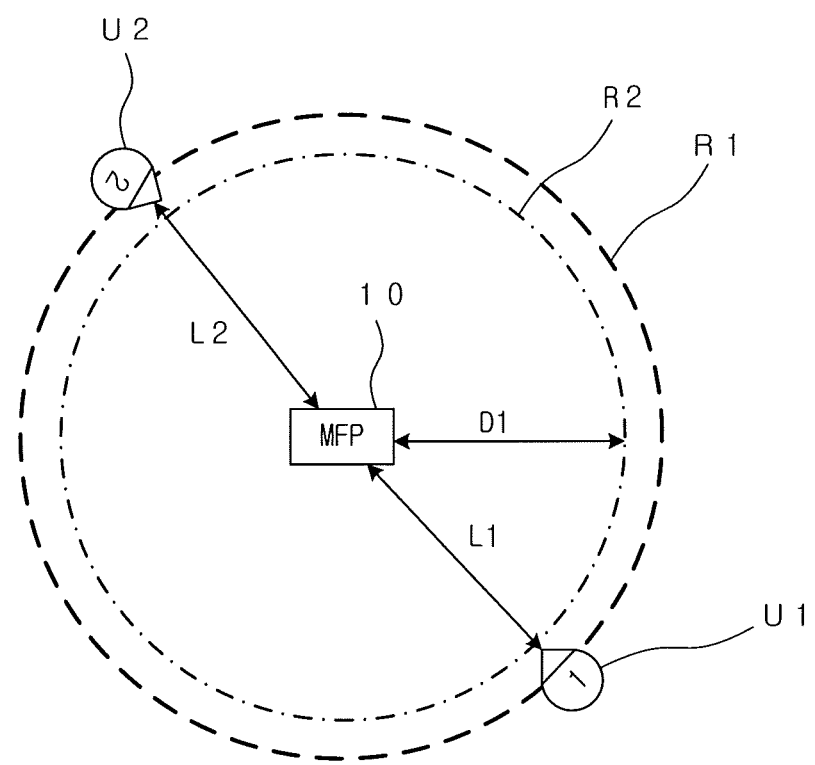
FIG. 10 is a view showing an example of the situation in which the print disallowed user U2 is not detected in the danger area R2 when the print allowed user U1 reaches the print start area R1.

For example, as shown in FIG. 10, in case that the print based on the authentication print job is started because the print disallowed user is not detected in the danger area R2 when the print allowed user U1 reaches the print start area R1, the danger distance D1 continues to be shortened (the danger area R2 continues to be reduced) while the print allowed user U1 continues to approach the print apparatus 10.

Figure 11:
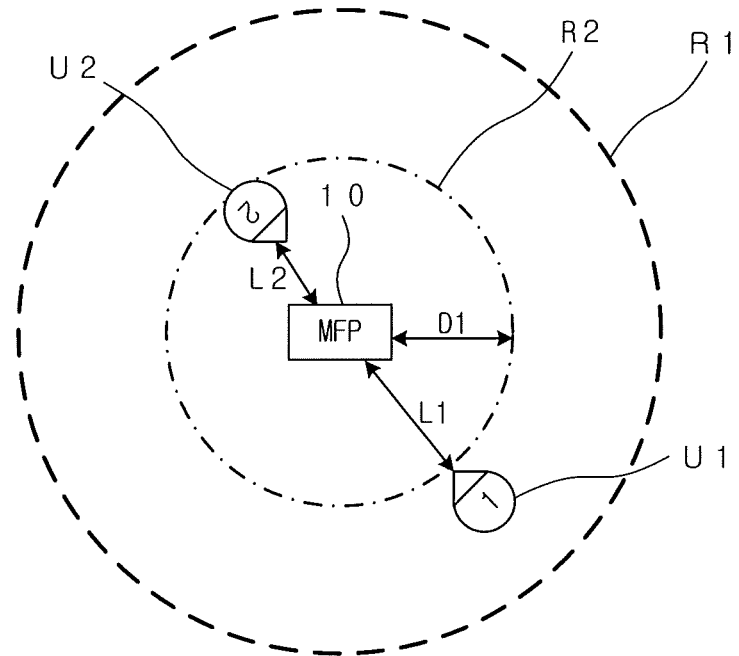
FIG. 11 is a view showing an example of the situation in which the print disallowed user U2 moves toward the print apparatus at the higher speed than the print allowed user U1 from the situation of FIG. 10.

However, as shown in FIG. 11, in case that the print disallowed user U2 moves toward the print apparatus 10 at the higher speed than the print allowed user U1, the print disallowed user U2 is detected in the danger area R2. In this case, the print apparatus 10 executes the action (concealment process) for preventing the printed document which is currently printed out in accordance with the authentication print job from being viewed by the print disallowed user U2, by using the concealment unit 24.

In case that the print apparatus 10 has the intermediate tray which cannot been seen from the outside, such as a finisher or the like, the concealment unit 24 executes the concealment process for stopping the discharge of the printed document to the outside by storing the printed document in the intermediate tray. Then, when the print allowed user U1 reaches the print apparatus 10, the concealment process is cancelled. Alternatively, in case that there is no intermediate tray, the concealment unit 24 stops the print before the print disallowed user moves near the print apparatus 10. At this time, in case that the printed document is discharged so as to direct the printed side downwardly, the printed contents are concealed. In case of the double-sided printing, after the print is stopped, the concealment process in which the blank sheet is discharged on the printed document is executed. Then, when the print allowed user U1 reaches the print apparatus 10, the print is restarted by cancelling the concealment process.

Figure 12:
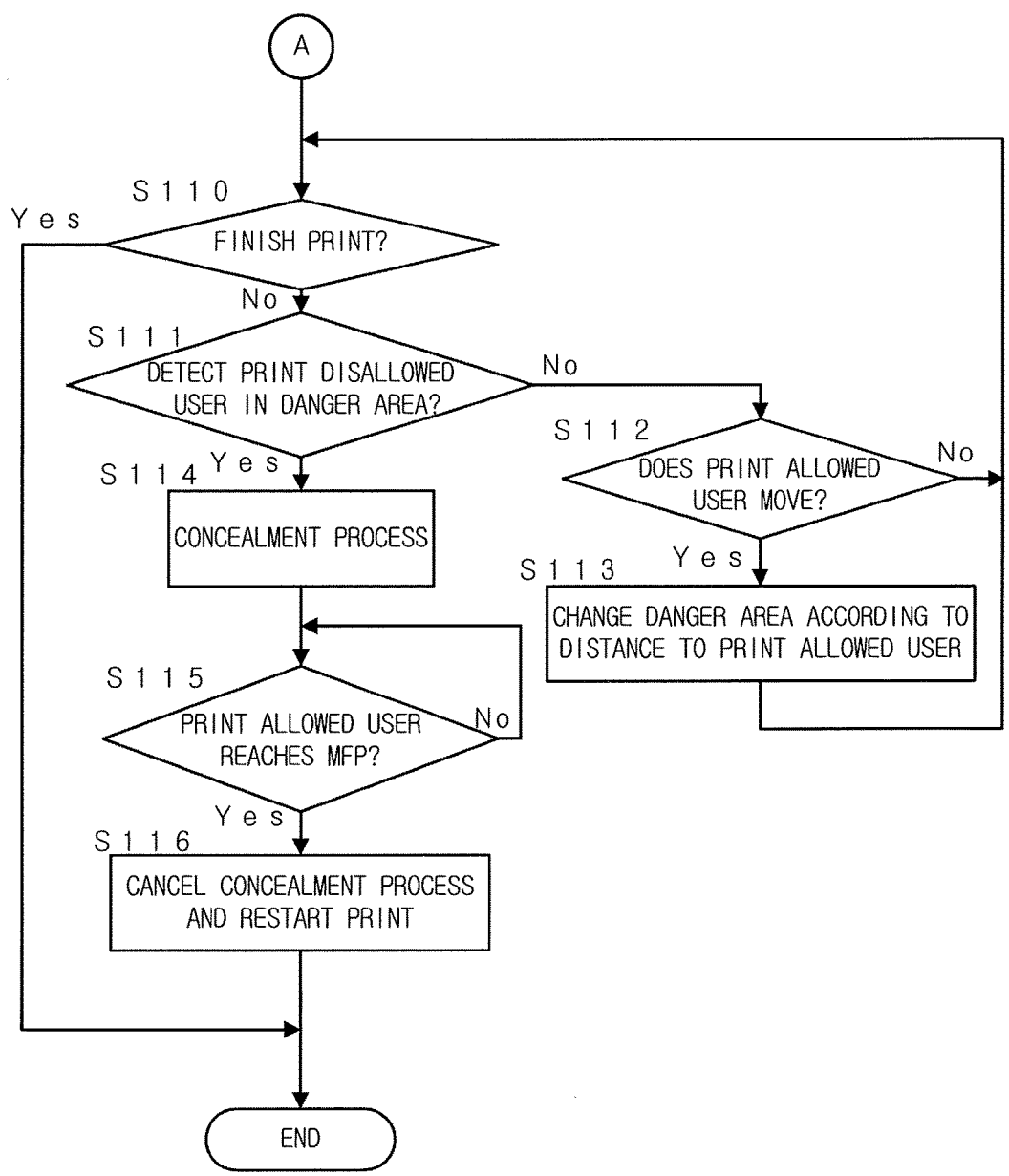
FIG. 12 is a flowchart showing the process which is carried out by the print apparatus after the print based on the authentication print job is started.

FIG. 12 shows the process which is carried out by the print apparatus 10 after the print based on the authentication print job is started. FIG. 12 shows the subsequent process to be executed after Step S106 shown in FIG. 7 or FIG. 9, or after Step S207 shown in FIG. 16 or Step S308 shown in FIG. 25, which will be explained later.

The print apparatus 10 monitors whether the print is finished (Step S110). In case that the print is not finished (Step S110; No), it is checked whether the print disallowed user is detected in the danger area R2 (Step S111). In case that the print disallowed user is not detected (Step S111; No), it is checked whether the print allowed user moves (Step S112). In case that the print allowed user does not move (Step S112; No), the process is continued by returning to Step S110.

In case that the print allowed user moves (Step S112; Yes), the danger area R2 is updated according to the distance L1 from the print apparatus 10 to the print allowed user (Step S113). Then, the process returns to Step S110.

In case that the print is finished (Step S110; Yes), the process is ended.

In case that the print disallowed user is detected in the danger area R2 before the print is finished (Step S111; Yes), the above-described concealment process is executed (Step S114). When the print allowed user reaches the print apparatus 10 (Step S115; Yes), the concealment process is cancelled and the print is restarted (Step S116). Then, the process is ended.

In the process shown in FIG. 12, the concealment process is executed when the print disallowed user enters the reduced danger area R2 after the print is started. However, in case that the concealment of the printed document is finished until the print disallowed user actually reaches the print apparatus 10, the security for the printed document is secured. Therefore, the time required to become the situation in which the printed document cannot be actually viewed by the user since the concealment process is started, is calculated. For example, in case that a plurality of sheets on which the document data is currently printed exist in the sheet conveyance path of the print apparatus 10, the time required to discharge all of the above sheets and stop the print or the time required to discharge the blank sheet on the sheets on which the document data is printed becomes the time required to become the situation in which the printed document cannot be actually viewed by the user since the concealment process is started.

The distance obtained by adding the predetermined margin distance to the distance by which the print disallowed user can move during the time required to become the above situation, is set to the limited distance D3. When the print disallowed user is detected in the danger area R2 and within the limited distance D3 from the print apparatus 10, the concealment process is started. In this embodiment, the area enclosed by the circle having the center at the print apparatus 10 and having the radius which is the limited distance D3 is the limited area R3. The print apparatus 10 judges whether the print disallowed user exists in the limited area R3.

Figure 13:
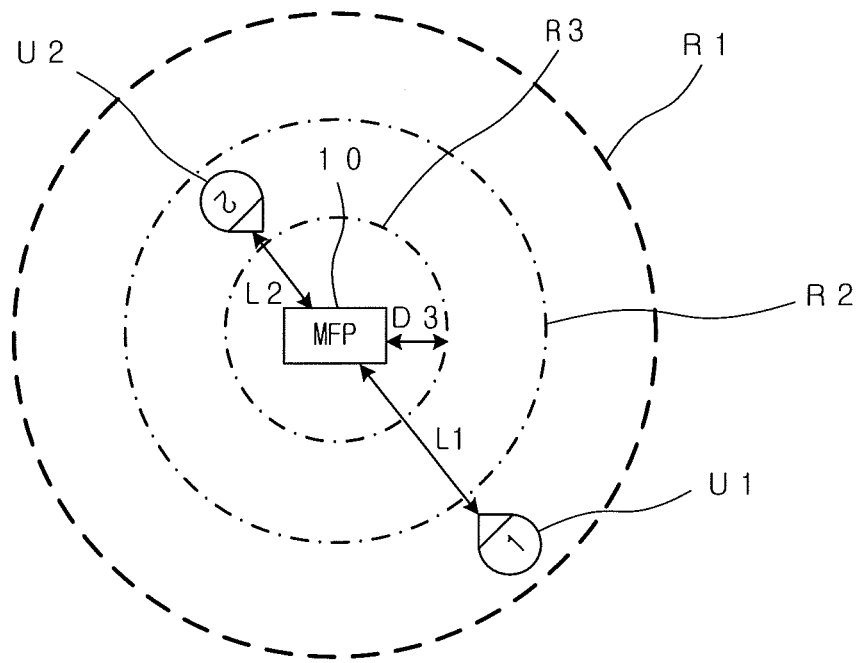
FIG. 13 is a view showing an example of the danger area R2 and the limited area R3.

In the example of FIG. 13, in the danger area R2 which is set according to the distance L1 from the print apparatus 10 to the print allowed user, the print disallowed user U2 exist. However, because the print disallowed user U2 does not exist in the limited area R3 (within the limited distance D3 from the print apparatus 10), the concealment process is not started. When the print disallowed user U2 further approaches the print apparatus 10 and enters the limited area R3, the concealment process is started.

Figure 14:
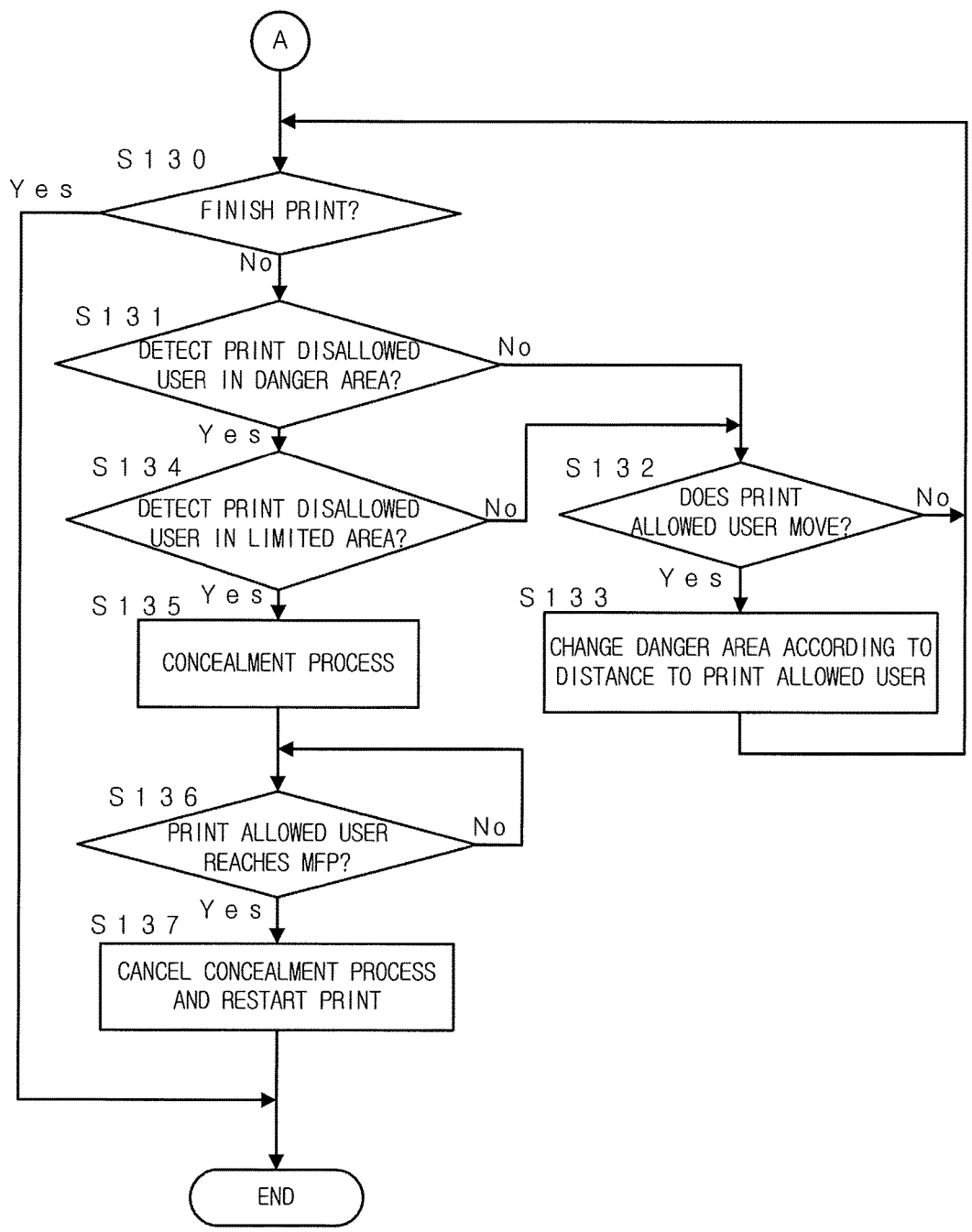
FIG. 14 is a flowchart showing the process which is carried out after the print based on the authentication print job is started and which is carried out in case that the concealment process is carried out in accordance with the limited area.

FIG. 14 is the flowchart showing the process which is carried out by the print apparatus 10 after the print based on the authentication print job is started and which is carried out for the control relating to the concealment process. FIG. 14 shows the subsequent process to be executed after Step S106 shown in FIG. 7 or FIG. 9, or after Step S207 shown in FIG. 16 or Step S308 shown in FIG. 25, which will be explained later.

The print apparatus 10 monitors whether the print is finished (Step S130). In case that the print is finished (Step S130; Yes), the process is ended.

In case that the print is not finished (Step S130; No), it is checked whether the print disallowed user is detected in the danger area R2 (Step S131). In case that the print disallowed user is not detected (Step S131; No), it is checked whether the print allowed user moves (Step S132). In case that the print allowed user does not move (Step S132; No), the process is continued by returning to Step S130.

In case that the print allowed user moves (Step S132; Yes), the print apparatus 10 updates the danger area R2 according to the distance L1 from the print apparatus 10 to the print allowed user (Step S133). Then, the process returns to Step S130.

In case that the print disallowed user is detected in the danger area R2 before the print is finished (Step S130; No and Step S131; Yes), it is checked whether the print disallowed user is detected in the limited area R3 (Step S134). In case that the print allowed user is not detected in the limited area R3 (Step S134; No), the process proceeds to Step S132.

In case that the print disallowed user is detected in the limited area R3 (Step S134; Yes), the above-described concealment process is executed (Step S135). When the print allowed user reaches the print apparatus 10 (Step S136; Yes), the concealment process is cancelled and the print is restarted (Step S137). Then, the process is ended.

When the print allowed user further approaches the print apparatus 10, the danger area R2 is smaller than the limited area R3. Therefore, the print disallowed user is detected in the limited area R3, but is not detected in the danger area R2. In this process, because the concealment process is executed only in the case in which the option "Yes" is decided in Step S131 and the option "Yes" is decided in the Step S134, the unnecessary concealment process is not executed in the above situation.

Next, the case in which the danger area is set in consideration of the walking speed, will be explained.

It is assumed that the walking speed of the print disallowed user is higher than that of the print allowed user. For example, the case in which the print disallowed user approaches the print apparatus 10 at the speed which is 1.5 times as high as a general walking speed (80 to 90 meters/minute) is assumed.

The area in which the print allowed user U1 can reach the print apparatus 10 prior to the print disallowed user U2 in case that the print disallowed user U2 approaches the print apparatus 10 at the above assumed walking speed, is set as the danger area R2. Then, the danger area R2 is reduced according to the approach of the print allowed user U1.

Figure 15:
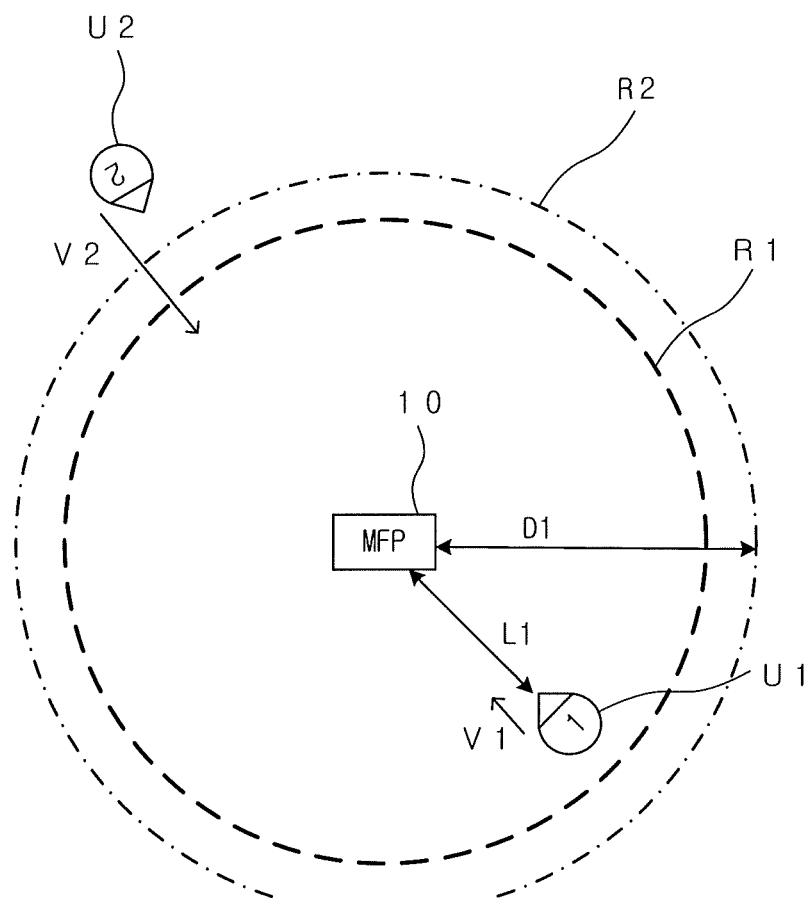
FIG. 15 is a view showing an example in which the danger area R2 is set in accordance with the moving speed V1 of the print allowed user.

In the example shown in FIG. 15, the print allowed user U1 walks toward the print apparatus 10 at the speed V1, and the print disallowed user U2 approaches the print apparatus 10 at the assumed walking speed V2. In case that the speed V2 is higher than the speed V1, the danger distance D1 (the radius of the danger area R2) is longer than the distance L1 from the print apparatus 10 to the print allowed user U1. For example, the distance ((L1/V1)×V2) by which the print disallowed user U2 can move in case that the print disallowed user U2 walks at the assumed walking speed for the time period (L1/V1) for which the print allowed user U1 reaches the print apparatus 10, is calculated from the time period (L1/V1) for which the print allowed user U1 reaches the print apparatus 10 and the assumed walking speed of the print disallowed user U2. Then, the distance obtained by adding the margin distance a to the calculated distance ((L1/V1)×V2) is set to the danger distance D1.

The walking speed V1 of the print allowed user U1 is actually measured. The assumed walking speed V2 of the print disallowed user U2 may be set so as to be 1.5 times as high as a general walking speed or may be a walking speed which is actually measured.

Figure 16:
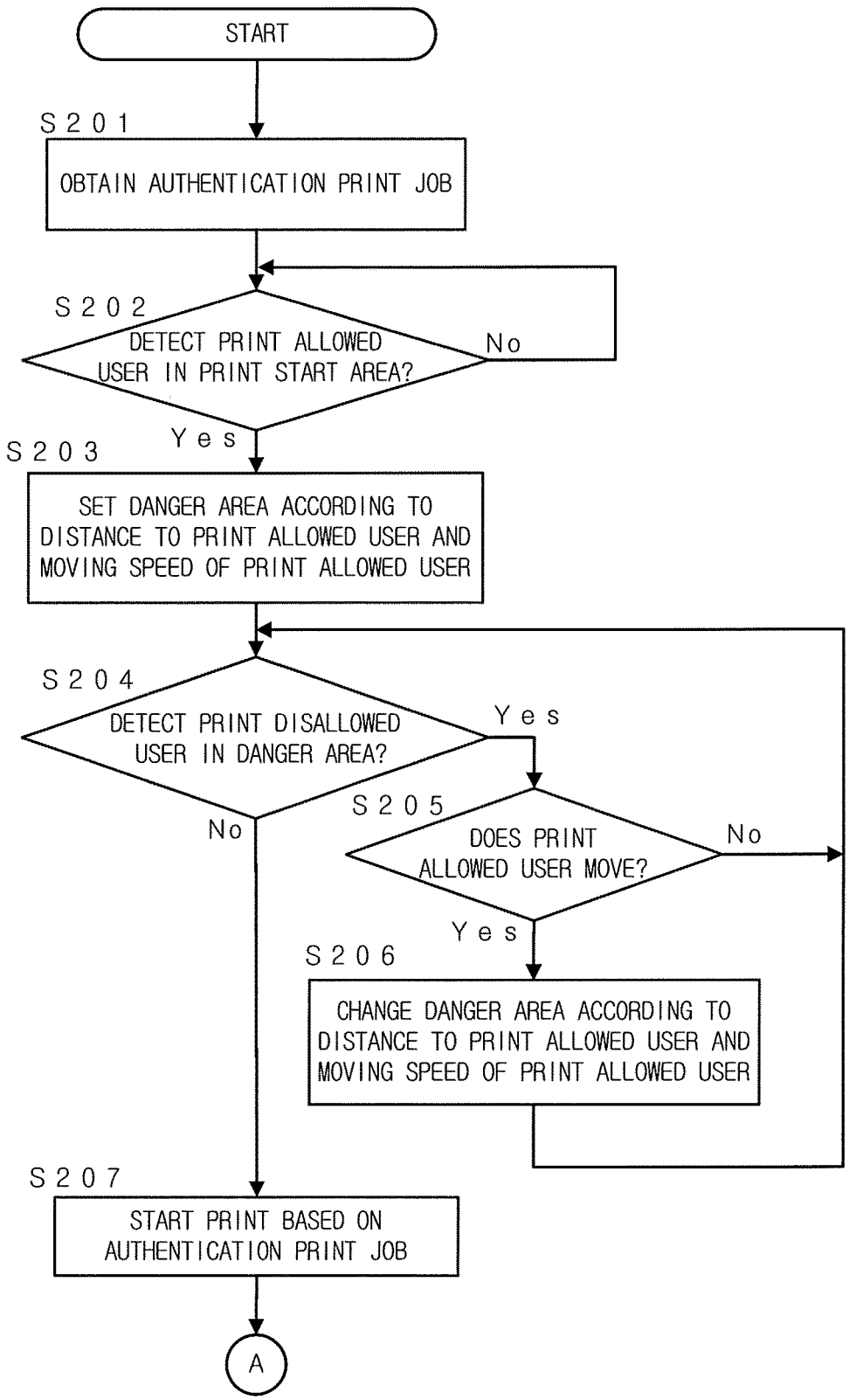
FIG. 16 is a flowchart showing the process which relates to the automatic print based on the authentication print job and which is carried out by the print apparatus in case that the walking speed is considered.

FIG. 16 shows the process which is carried out by the print apparatus 10 in case that the walking speed is considered. When the print apparatus 10 receives the authentication print job from the external PC terminal 4 or the like (Step S201), the print apparatus 10 stores the received authentication print job in the hard disk drive 15 thereof, or the like. Then, the print apparatus 10 starts the detection of the print allowed user U1 who inputs the authentication print job, and judges whether the print allowed user U1 enters the print start area R1 (Step S202).

When the print allowed user U1 who enters the print start area R1 is detected (Step S202; Yes), the danger distance D1 (the danger area R2) is set in accordance with the distance L1 from the print apparatus 10 to the print allowed user U1, the walking speed V1 of the print allowed user U1 and the assumed walking speed V2 of the print disallowed user U2 (Step S203).

It is checked whether the print disallowed user U2 is detected in the set danger area R2 (Step S204). When the print disallowed user U2 does not exist within the danger area R2 (Step S204; No), the print based on the authentication print job is started (Step S207).

In case that the print disallowed user U2 is detected in the danger area R2 (Step S204; Yes), it is judged whether the print allowed user U1 moves (Step S205). In case that the print allowed user U1 does not move (Step S205; No), the process is continued by returning to Step S204. In case that the print allowed user U1 moves (Step S205; Yes), after the danger distance D1 (the danger area R2) is reset in accordance with the distance L1 from the print apparatus 10 to the print allowed user U1, the walking speed V1 of the print allowed user U1 and the assumed walking speed V2 of the print disallowed user U2 (Step S206), the process is continued by returning to Step S204.

Next, the case in which the shape of the danger area R2 (the danger distance D1 in each direction) is set in consideration of the position of the discharge tray of the print apparatus 10, will be explained.

Figure 17:
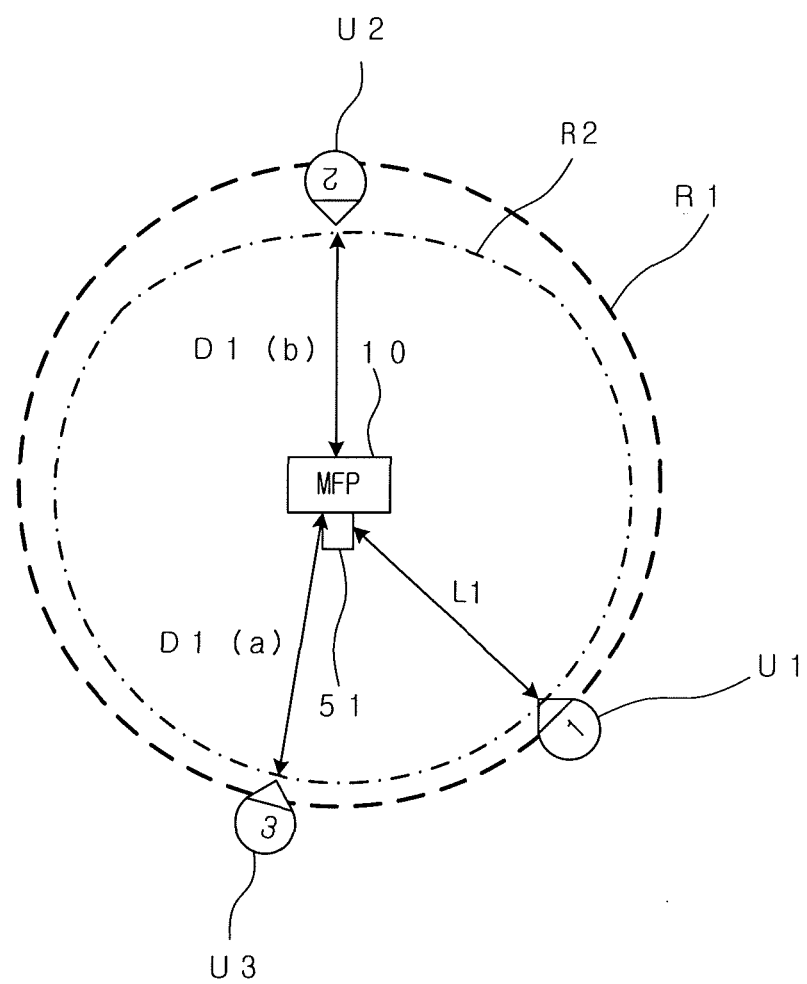
FIG. 17 is a view showing an example in which the danger distance (the shape of the danger area) is changed according to the positional relation between the discharge tray and the print disallowed user.

FIG. 17 shows an example in which the danger distance D1 for the print disallowed user is changed according to the relation between the position at which the discharge tray 51 is provided (the direction in which the discharge tray 51 is provided from the main body of the print apparatus 10) and the position (the direction) of the print disallowed user.

The print disallowed user U3 who approaches the print apparatus 10 from the position toward which the discharge tray 51 projects from the main body of the print apparatus 10, can easily view the printed document discharged on the discharge tray 51 as compared with the print disallowed user U2 who approaches the print apparatus 10 from the position which is opposite to the position at which the discharge tray 51 is provided. Therefore, the danger distance D1 is determined in consideration of the direction in which the discharge tray 51 is provided from the main body of the print apparatus 10 and the position at which the print disallowed user exists. That is, the danger area R2 is set so as not to be formed in the circle having the center at the print apparatus 10, but to have the shape in which the danger distance D1(a) which extends in the direction in which the discharge tray 51 is provided is longer than the danger distance D1(b) which extends in the direction opposite to the direction in which the discharge tray 51 is provided.

Figure 18:
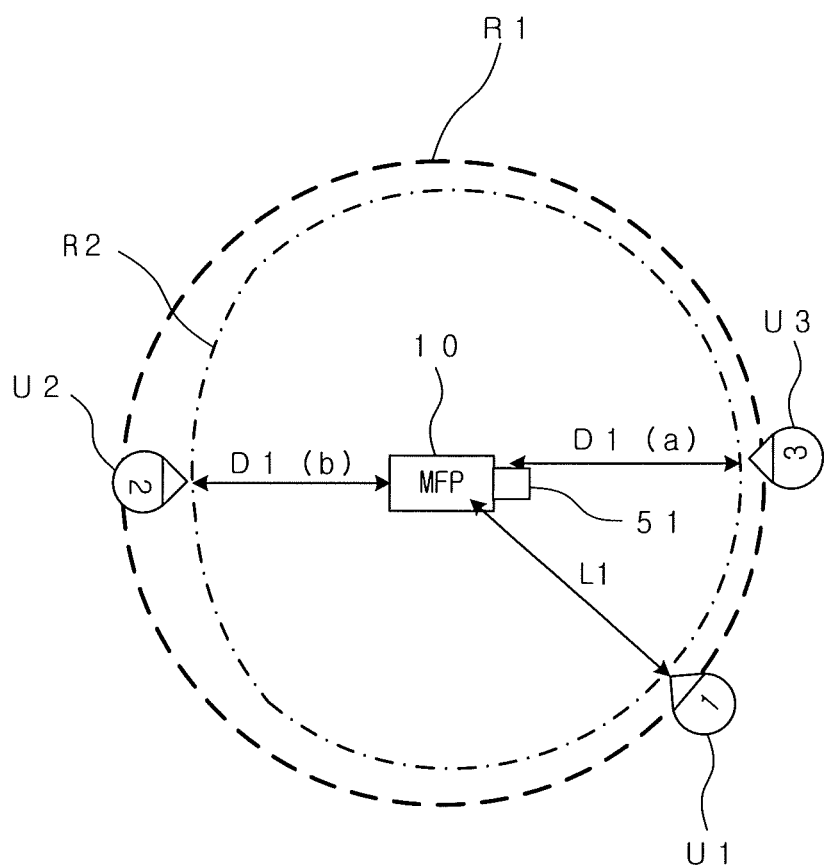
FIG. 18 is a view showing another example in which the danger distance (the shape of the danger area) is changed according to the positional relation between the discharge tray and the print disallowed user.

FIG. 17 shows the shape of the danger area R2 in case that the discharge tray 51 is provided on the front side of the print apparatus 10. FIG. 18 shows the shape of the danger area R2 in case that the discharge tray is provided on the right side of the print apparatus 10.

Because the position of the discharge tray is switched according to the attachment situation or the use situation of the option device, such as a post-processing device, the shape of the danger area R2 is changed according to the position of the discharge tray.

Next, the method for setting the print start area R1 and the danger area R2 in case that the obstacle exists near the print apparatus 10, will be explained.

In case that the obstacle, such as a partition or the like, is provided, because a user who exists on the opposite side of the obstacle approaches the print apparatus 10 along the route for avoiding the obstacle, the time at which the user reaches the print apparatus 10 is delayed due to the above route. Therefore, the danger area is set so as to secure the danger distance on the route in case that the user approaches the print apparatus 10 so as to avoid the obstacle.

Figure 19:
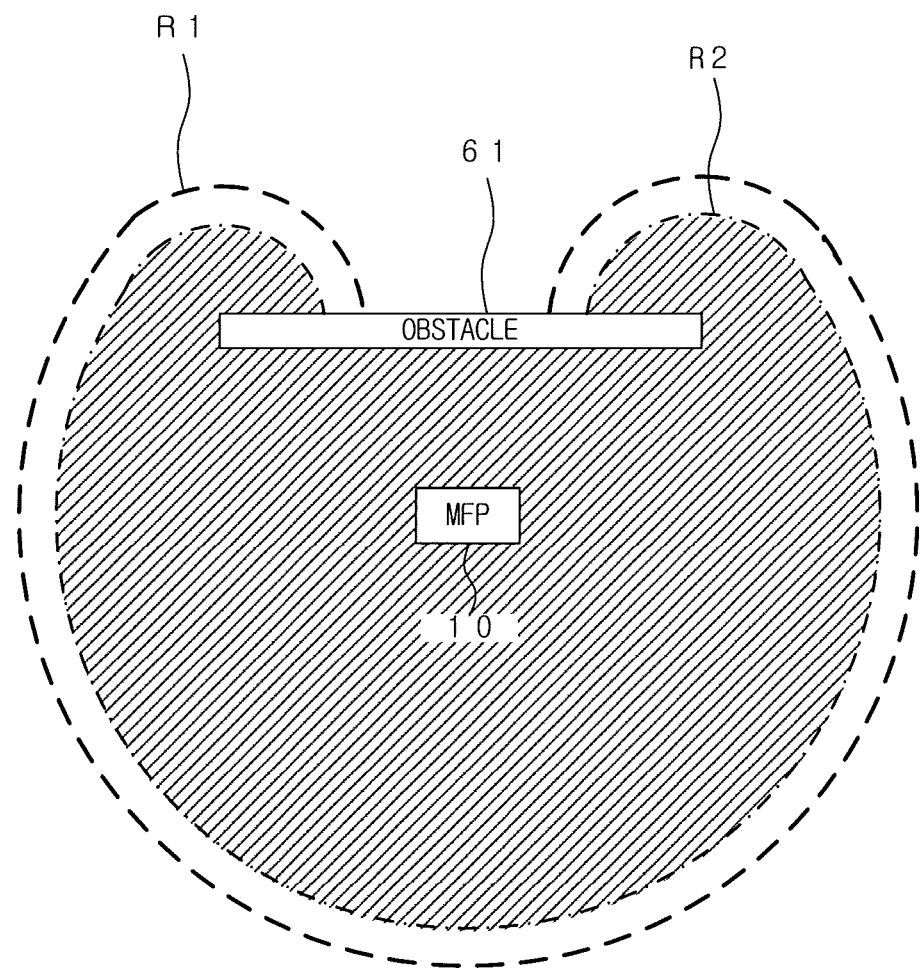
FIG. 19 is a view showing an example of the print start area R1 and the danger area R2 in case that the obstacle exists near the print apparatus.
Figure 20:
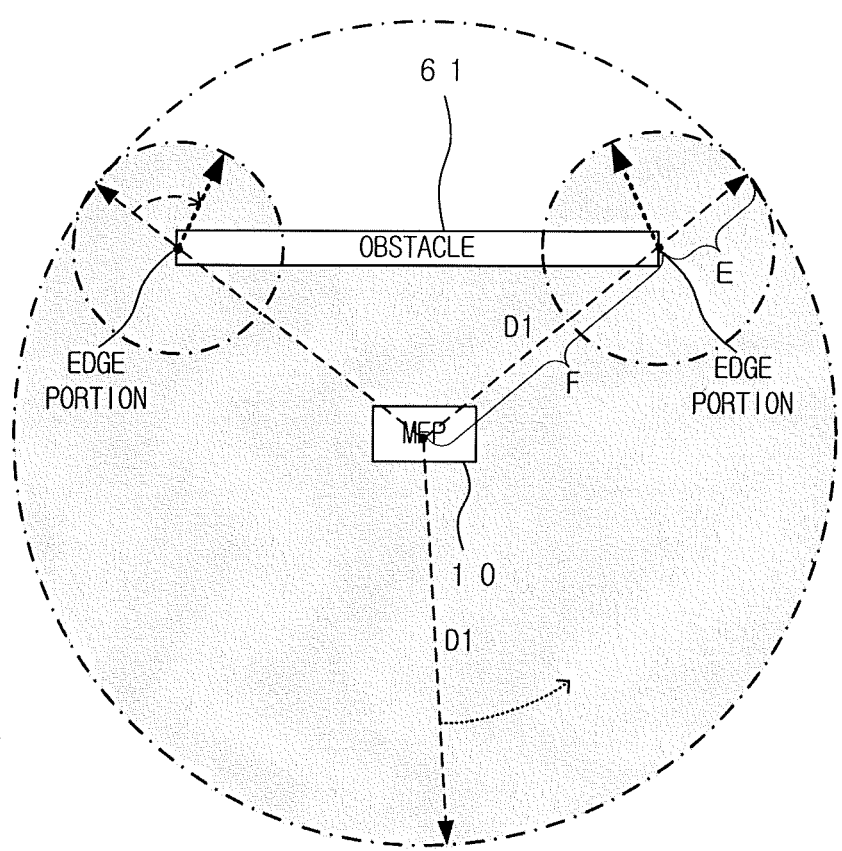
FIG. 20 is an explanation view showing the method for setting the danger area R2 of FIG. 19.

FIG. 19 shows an example of the print start area R1 and the danger area R2 in case that the obstacle 61 exists near the print apparatus 10. FIG. 20 is a view for explaining the method for setting the danger area R2 of FIG. 19.

In FIG. 20, the danger area R2 is set as follows. Firstly, the rope having the end which is fixed at the center of the print apparatus 10 and having the length of the danger distance D1 is turned around the print apparatus 10 while the rope is tightly stretched. When the rope comes in contact with the edge portion of the obstacle 61, the arc having the center at the contact position is drawn by the portion E which is a free end portion of the rope from the contact position. The inner area of the locus of the free end of the turned rope (the grayed area) is the danger area R2 in consideration of the obstacle 61. That is, the circle having the center at the edge portion of the obstacle 61 and having the radius of the difference E between the distance F from the edge portion of the obstacle 61 to the print apparatus 10 and the danger distance D1 is drawn. Then, the area obtained by adding the drawn circle to the danger area which is arranged on the print apparatus 10 side of the obstacle 61 may be set to the danger area in consideration of the obstacle 61. Similarly, the print start area R1 is set as described above.

Figure 21:
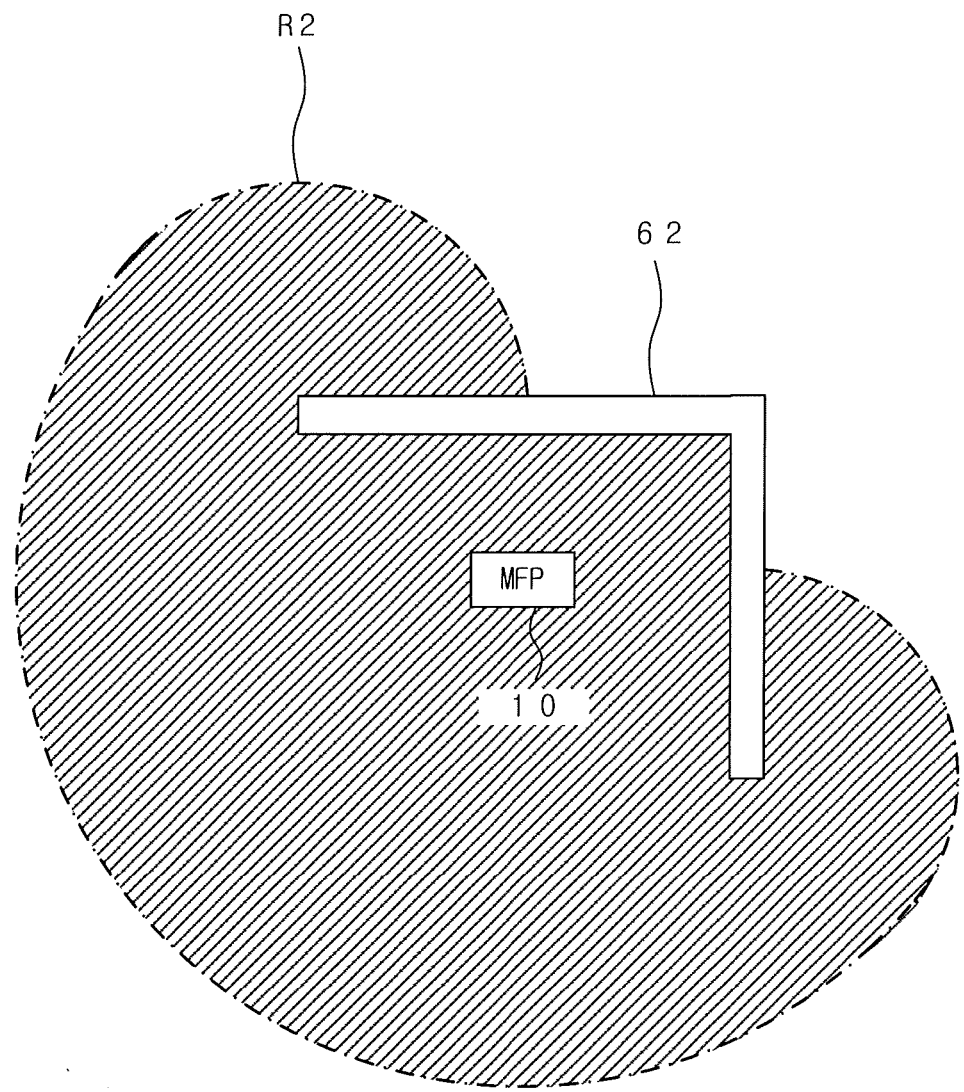
FIG. 21 is a view showing the danger area R2 in case that the L-shaped obstacle exists.
Figure 22:
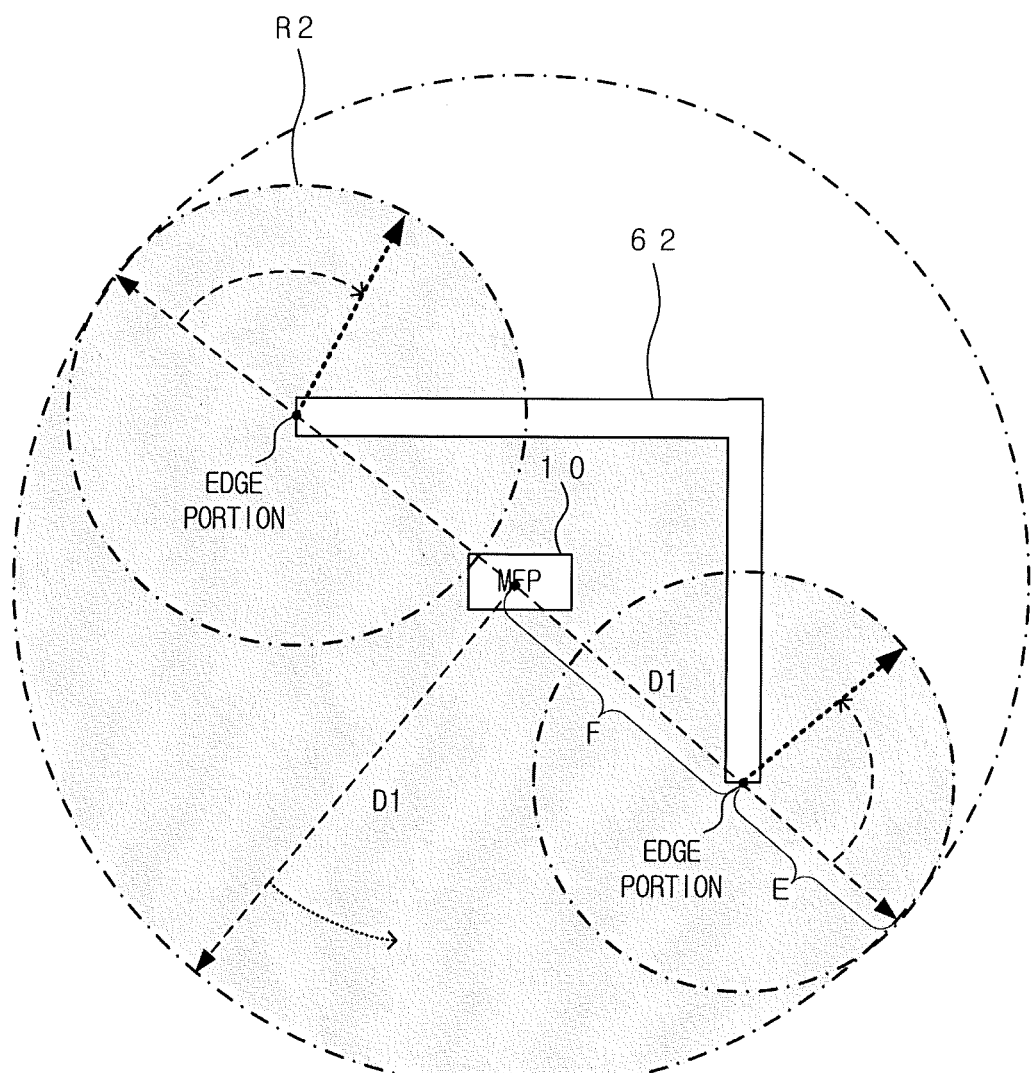
FIG. 22 is an explanation view showing the method for setting the danger area R2 of FIG. 21.

FIG. 21 shows the danger area R2 in case that the L-shaped obstacle 62 exists. FIG. 22 shows the method for setting the danger area R2 of FIG. 21. The method for setting the danger area R2 is the same as that of FIG. 20. The explanation thereof is omitted. The grayed area is the danger area R2 in consideration of the L-shaped obstacle 62.

Next, the case in which the dead angle in which the print disallowed user cannot be detected by the second detection unit 32 of the print apparatus 10 is caused due to the existence of the obstacle 61 or the L-shaped obstacle 62, will be explained.

Figure 23:
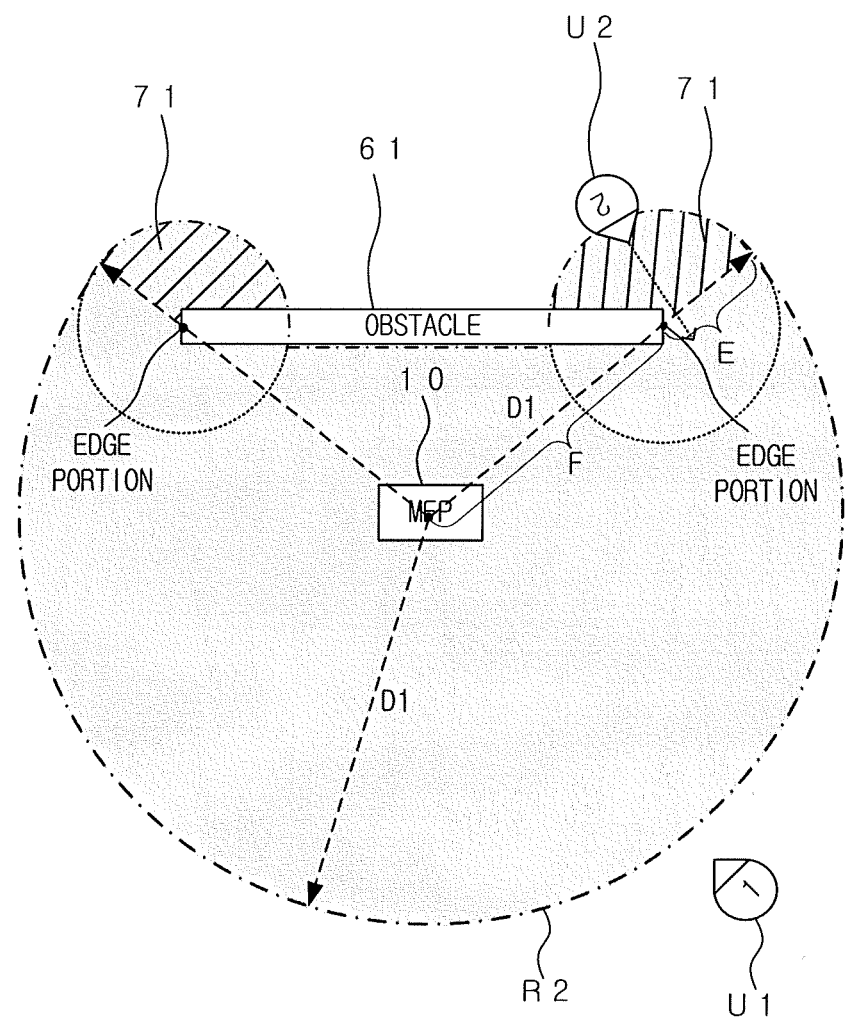
FIG. 23 is a view showing the dead angle range of the detection due to the obstacle.
Figure 24:
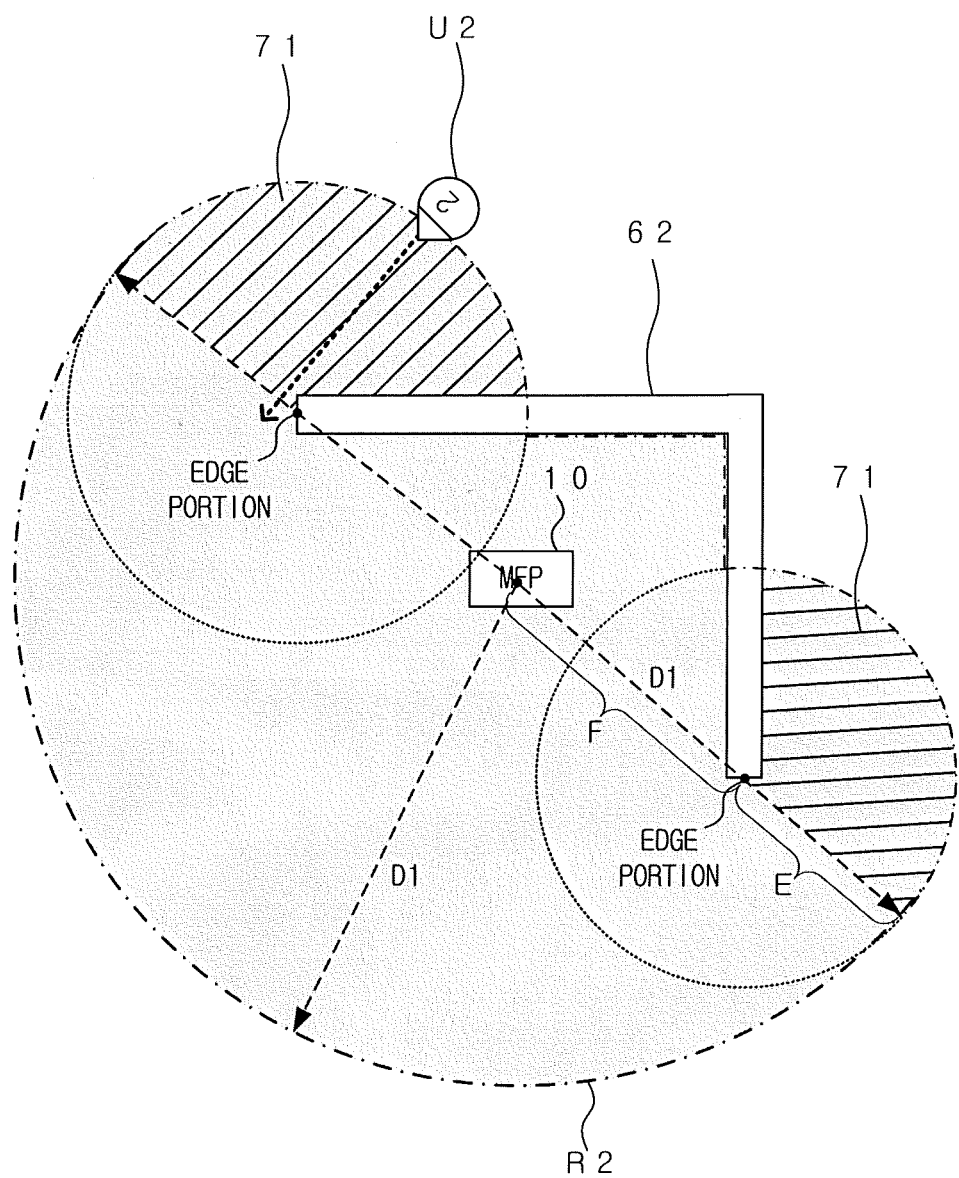
FIG. 24 is a view showing the dead angle range of the detection due to the L-shaped obstacle.

FIG. 23 shows the dead angle range 71 of the second detection unit 32 due to the obstacle 61 among the danger area R2 which is set when the print allowed user U1 enters the print start area R1. FIG. 24 shows the dead angle range 71 of the second detection unit 32 due to the L-shaped obstacle 62 among the danger area R2 which is set when the print allowed user U1 enters the print start area R1.

The circle having the center at the edge portion of the obstacle 61 or 62 and having the radius of the difference E between the distance F from the edge portion to the print apparatus 10 and the danger distance D1 is drawn. Then, the part which is arranged on the opposite side of the obstacle 61 or 62 among the drawn circle is set as the dead angle range 71.

The print apparatus 10 calculates the maximum time (appearance waiting time) until which the print disallowed user U2 who exists in the dead angle range 71 reaches the detectable area in which the print disallowed user U2 can be detected in the danger area R2.

The appearance waiting time is the time which is required to walk at a general walking speed by the distance which is the difference E between the distance F from the edge portion of the obstacle to the print apparatus 10 and the danger distance D1. The general walking speed may be suitably set. In case that the obstacle which exists in the danger area R2 has a plurality of edge portions, the appearance waiting time which is the maximum among the appearance waiting time calculated for each edge portion, may be used.

Then, in case that the print disallowed user is not detected in the danger area R2 when the print allowed user U1 enters the print start area R1, the print apparatus 10 waits for the start of the print until the appearance waiting time has elapsed. In case that the print disallowed user is detected before the appearance waiting time elapses, the print apparatus 10 does not start the print based on the authentication print job. Only in case that the print disallowed user is not detected until the appearance waiting time has elapsed, the print apparatus 10 starts the print based on the authentication print job.

Figure 25:
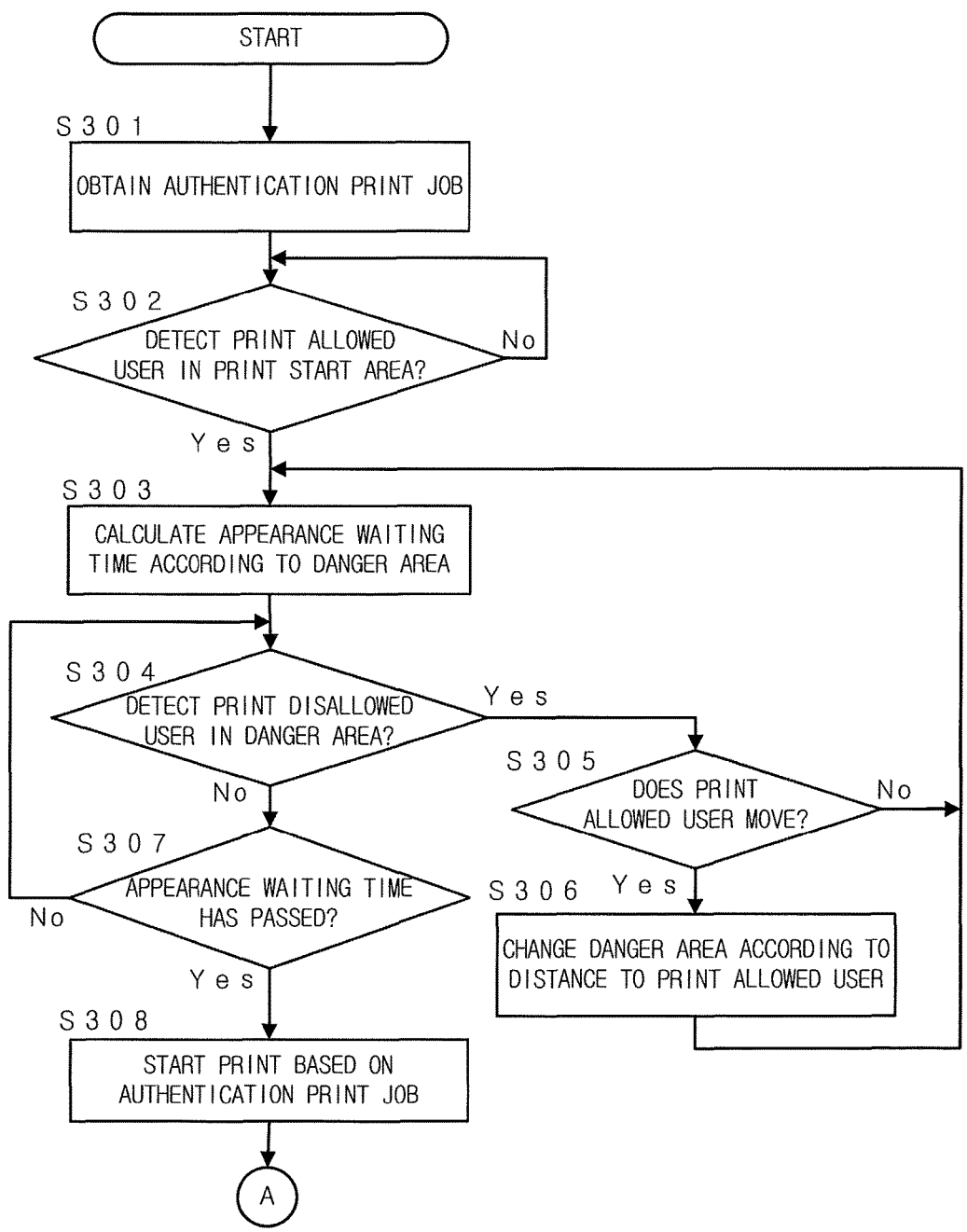
FIG. 25 is a flowchart showing the process which relates to the automatic print based on the authentication print job and which is carried out by the print apparatus in case that the dead angle range of the detection is considered.

FIG. 25 is the flowchart showing the process which relates to the automatic print based on the authentication print job and which is carried out by the print apparatus 10 in case that the dead angle range 71 of the second detection unit 32 is considered. When the print apparatus 10 receives the authentication print job from the external PC terminal 4 or the like (Step S301), the print apparatus 10 stores the received authentication print job in the hard disk drive 15 thereof, or the like. Then, the print apparatus 10 starts the detection of the print allowed user U1 who inputs the authentication print job, and judges whether the print allowed user U1 enters the print start area R1 (Step S302).

When the print allowed user U1 who enters the print start area R1 is detected (Step S302; Yes), the appearance waiting time corresponding to the current danger distance D1 (the current danger area R2) is calculated (Step S303).

It is checked whether the print disallowed user U2 is detected in the danger area R2 (Step S304). In case that the print disallowed user U2 does not exist within the danger area R2 (Step S304; No), the print apparatus 10 monitors whether the appearance waiting time has elapsed in the situation in which the print disallowed user is not detected (Step S307; No).

In case that the print disallowed user U2 is not detected until the appearance waiting time has elapsed (Step S307; Yes), the print apparatus 10 starts the print based on the authentication print job (Step S308).

In case that the print disallowed user U2 is detected in the danger area R2 (Step S304; Yes), or in case that the print disallowed user U2 is detected before the appearance waiting time elapses (Step S307; No and Step S304; Yes), it is judged whether the print allowed user U1 moves (Step S305). In case that the print allowed user U1 does not move (Step S305; No), the process is continued by returning to Step S303. In case that the print allowed user U1 moves (Step S305; Yes), after the danger distance D1 (the danger area R2) is changed according to the current distance L1 from the print apparatus 10 to the print allowed user U1 (Step S306), the process is continued by returning to Step S303.

As described above, in case that the dead angle range 71 is caused in the danger area R2 due to the obstacle, even though the print allowed user U1 enters the print start area R1 and the print disallowed user is not detected, the print apparatus 10 does not immediately start the print based on the authentication print job. Then, further, on condition that the user disallowed user is not detected until the appearance waiting time has elapsed, the print apparatus 10 starts the print. Therefore, it can be prevented that the print is immediately stopped due to the detection of the print disallowed user who hides in the dead angle range 71 and then appears in the detectable area after the print is started.

As described above, the embodiment is explained by using the drawings. However, in the present invention, the concrete configuration is not limited to the above embodiment. In the present invention, various modifications of the above embodiment or the addition of various functions or the like to the embodiment can be carried out without departing from the gist of the invention.

In this embodiment, it is judged whether the print based on the authentication print job is started according to whether the print allowed user U1 exists in the print start area R1 and the print disallowed user U2 exists in the danger area R2. However, the danger distance D1 which is set according to the distance L1 from the print apparatus to the print allowed user may be compared with the distance L2 from the print apparatus to the nearest print disallowed user, and it may be judged whether the print based on the authentication print job is started in accordance with the result of the above comparison. Similarly, the concealment process may be started in accordance with the result of the above comparison.

The method for detecting the print allowed user U1 and the print disallowed user U2 is not limited to the embodiment. The print allowed user U1 and the print disallowed user U2 may be detected by using a camera or the like.

The danger distance D1 may be equal to the first distance (the distance from the print apparatus to the print allowed user) L1. Alternatively, the danger distance D1 may be the distance which is increased or decreased according to the first distance, such as the distance which is set by adding a certain distance to the first distance L1, subtracting a certain distance from the first distance L1 or multiplying the first distance L1 by a predetermined ratio.

In the embodiment, the danger distance is changed according to the distance (the first distance) from the print apparatus to the print allowed user. That is, the danger distance is shortened as the print allowed user approaches the print apparatus. Then, in case that the first distance is not more than the print start distance, the danger distance is compared with the distance (the second distance) from the print apparatus to the nearest print disallowed user. In accordance with the result of the above comparison, the automatic start of the print based on the print job which is input by the print allowed user is controlled. For example, even though the print disallowed user exists within the danger distance from the print apparatus at first, in case that the print allowed user approaches the print apparatus and the distance from the print apparatus to the print disallowed user becomes longer than the danger distance by shortening the danger distance, the automatic print is started. The danger distance may be equal to the first distance (the distance from the print apparatus to the print allowed user), or may be the distance which is set by adding a certain distance to the first distance or subtracting a certain distance from the first distance, or the distance which is increased or decreased according to the first distance.

In this embodiment, the security for the printed document is not badly influenced since the print is started until the first page of the document is discharged. Therefore, the danger distance is set in accordance with the position of the print allowed user at the timing at which the discharge of the first page is finished.

In this embodiment, in case that the print disallowed user approaches the print apparatus within the danger area after the print is started, the concealment process for securing the security for the printed document is executed.

In this embodiment, when the print disallowed user approaches the print apparatus within the danger distance and the limited distance from the print apparatus after the print is started, the concealment process is executed. In case that the print disallowed user enters the limited area, there is some possibility that the security for the printed document is compromised by the print disallowed user. However, in case that the print allowed user previously exists near the print apparatus, the security for the printed document is not compromised. Therefore, when the print disallowed user exists within the danger distance and the limited distance from the print apparatus, the concealment process is executed. On the other hand, when the print disallowed user exists within the limited distance from the print apparatus but exists apart from the print apparatus by the danger distance or more, the concealment process is not executed.

In this embodiment, the distance by which the print disallowed user can move during the time which is necessary for the print allowed user to reach the print apparatus, is set as the danger area. The moving speed of the print allowed user and the moving speed of the print disallowed user may be the specified values. However, preferably, the measured values are used as the moving speed of the print allowed user and the moving speed of the print disallowed user.

In this embodiment, the danger distance is determined in consideration of the difference between the case in which the print disallowed user approaches the print apparatus from the position toward which the discharge tray projects from the main body of the print apparatus and the case in which the print disallowed user approaches the print apparatus from the position which is opposite to the position at which the discharge tray is provided.

In this embodiment, it is assumed that when the print allowed user approaches the print apparatus within the print start distance from the print apparatus, the print disallowed user who moves toward the print apparatus is not detected because the print disallowed user exists in the dead angle of the detection area. The print apparatus waits for the start of the print until the predetermined time (the time until which the print disallowed user is out of the dead angle and is detected) has elapsed. Then, only in case that the print disallowed user is not detected until the above predetermined time has elapsed, the automatic print is started.

In this embodiment, the danger area corresponding to the danger distance is set. Then, it is judged whether the print disallowed user exists in the danger area.

In this embodiment, the danger area is changed according to the distance from the print apparatus to the print allowed user. That is, as the print allowed user approaches the print apparatus, the danger area is reduced. Then, in case that the first distance is not more than the predetermined print start distance, when the print disallowed user does not exist in the danger area, the automatic start of the print based on the print job which is set by the print allowed user is controlled. For example, even though the print disallowed user exists in the danger area at first, in case that the print allowed user approaches the print apparatus and the print disallowed user is out of the danger area by reducing the danger area, the automatic print is started.

According to the print apparatus and the non-transitory computer-readable recording medium, it is possible to shorten the standby time until the finish of the print while the security for the printed document is secured.

The present U.S. patent application claims the priority of Japanese Patent Application No. 2015-124028, filed on Jun. 19, 2015, according to the Paris Convention, and the entirety of which is incorporated herein by reference for correction of incorrect translation.

What is claimed is:

1. A print apparatus for printing a document based on a print job set by a print allowed user, comprising:
   a memory configured to store the print job;

a print engine configured to execute a print based on the print job;
a first sensor configured to detect the print allowed user around the print apparatus;
a second sensor configured to detect a print disallowed user who is different from the print allowed user around the print apparatus; and
a hardware processor configured to:
  obtain the print job,
  change a danger distance according to a first distance which is a distance from the print apparatus to the print allowed user detected by the first sensor,
  compare the danger distance with a second distance which is a distance from the print apparatus to the print disallowed user who exists nearest to the print apparatus among the print disallowed users detected by the second sensor when the first distance is not more than a predetermined print start distance, and
  instruct the print engine to start the print based on the print job in accordance with a result of comparing the danger distance with the second distance.

2. The print apparatus of claim 1, wherein when the hardware processor judges that the second distance is more than the danger distance, the hardware processor instructs the print engine to start the print based on the print job.

3. The print apparatus of claim 1, wherein the danger distance is obtained by subtracting a certain distance from the first distance.

4. The print apparatus of claim 3, wherein the certain distance is obtained by multiplying a moving speed of the print allowed user by a time since the print is started until a first page of the document is discharged.

5. The print apparatus of claim 1, further comprising:
a concealment unit configured to execute a concealment process for concealing a printed document so as not to be viewed from an outside,
wherein after the print based on the print job is started, when the second distance is not more than the danger distance, the hardware processor instructs the concealment unit to start the concealment process.

6. The print apparatus of claim 1, further comprising:
a concealment unit configured to execute a concealment process for concealing a printed document so as not to be viewed from an outside,
wherein after the print based on the print job is started, when the second distance is not more than the danger distance and the second distance is not more than a predetermined limited distance, the hardware processor instructs the concealment unit to start the concealment process.

7. The print apparatus of claim 6, wherein the limited distance is a distance by which the print disallowed user can move during a time required to execute the concealment process.

8. The print apparatus of claim 1, wherein the hardware processor determines the danger distance in accordance with a distance by which the print disallowed user can move during a time which is necessary for the print allowed user to move by the first distance.

9. The print apparatus of claim 1, wherein the hardware processor determines the danger distance in consideration of a relation between a direction in which a discharge tray is provided from the print apparatus and a position of the print disallowed user who exists nearest to the print apparatus.

10. The print apparatus of claim 1, wherein the hardware processor corrects the second distance to a distance corresponding to a case in which the print disallowed user approaches the print apparatus so as to avoid an obstacle provided near the print apparatus, in accordance with information relating to the obstacle.

11. The print apparatus of claim 1, wherein in case that a dead angle range is caused in a detection area of the second sensor, when the print disallowed user who satisfies a condition in which the second distance is not more than the danger distance is not detected at a timing at which the first distance is not more than the print start distance, the hardware processor instructs the print engine to wait for the print based on the print job until a predetermined time elapses, and
only in case that the print disallowed user is not detected by the second detection unit until the predetermined time elapses, the hardware processor instructs the print engine to start the print based on the print job.

12. The print apparatus of claim 1, wherein the danger distance is a distance from an outer edge of a danger area which is set around the print apparatus, to the print apparatus, and
the hardware processor changes the danger distance by changing the danger area according to the first distance, and the hardware processor compares the danger distance with the second distance by judging whether the print disallowed user exists in the danger area.

13. A print apparatus for printing a document based on a print job set by a print allowed user, comprising:
a memory configured to store the print job;
a print engine configured to execute a print based on the print job;
a first sensor configured to detect the print allowed user around the print apparatus;
a second sensor configured to detect a print disallowed user who is different from the print allowed user around the print apparatus; and
a hardware processor configured to:
  obtain the print job,
  change a danger area which is set around the print apparatus, according to a distance from the print apparatus to the print allowed user detected by the first sensor, and
  instruct the print engine to start the print based on the print job on condition that the print disallowed user does not exist in the danger area when the print allowed user exists in a predetermined print start area which is set around the print apparatus.

14. A non-transitory computer-readable recording medium in which a program is stored, wherein the program causes a hardware processor of a print apparatus to:
  obtain a print job set by a print allowed user;
  store the obtained print job in a memory of the print apparatus;
  instruct a print unit of the print apparatus to execute a print based on the print job;
  instruct a first detector of the print apparatus to detect the print allowed user around the print apparatus;
  instruct a second detector of the print apparatus to detect a print disallowed user who is different from the print allowed user around the print apparatus;
  change a danger distance according to a first distance which is a distance from the print apparatus to the print allowed user detected by the first detector;
  compare the danger distance with a second distance which is a distance from the print apparatus to the print disallowed user who exists nearest to the print apparatus among the print disallowed users detected by the second detector when the first distance is not more than a predetermined print start distance; and instruct the print unit to start the print based on the print job in accordance with a result of comparing the danger distance with the second distance.

15. The non-transitory computer-readable recording medium of claim 14, wherein when the hardware processor judges that the second distance is more than the danger distance, the hardware processor instructs the print unit to start the print based on the print job.

16. The non-transitory computer-readable recording medium of claim 14, wherein the danger distance is obtained by subtracting a certain distance from the first distance.

17. The non-transitory computer-readable recording medium of claim 16, wherein the certain distance is obtained by multiplying a moving speed of the print allowed user by a time since the print is started until a first page of a document printed based on the print job is discharged.

18. The non-transitory computer-readable recording medium of claim 14, wherein the hardware processor instructs a concealment unit of the print apparatus to execute a concealment process for concealing a printed document so as not to be viewed from an outside,
wherein after the print based on the print job is started, when the second distance is not more than the danger distance, the hardware processor instructs the concealment unit to start the concealment process.

19. The non-transitory computer-readable recording medium of claim 14, wherein the hardware processor instructs a concealment unit of the print apparatus to execute a concealment process for concealing a printed document so as not to be viewed from an outside,
wherein after the print based on the print job is started, when the second distance is not more than the danger distance and the second distance is not more than a predetermined limited distance, the hardware processor instructs the concealment unit to start the concealment process.

20. The non-transitory computer-readable recording medium of claim 19, wherein the limited distance is a distance by which the print disallowed user can move during a time required to execute the concealment process.

21. The non-transitory computer-readable recording medium of claim 14, wherein the hardware processor determines the danger distance in accordance with a distance by which the print disallowed user can move during a time which is necessary for the print allowed user to move by the first distance.

22. The non-transitory computer-readable recording medium of claim 14, wherein the hardware processor determines the danger distance in consideration of a relation between a direction in which a discharge tray is provided from the print apparatus and a position of the print disallowed user who exists nearest to the print apparatus.

23. The non-transitory computer-readable recording medium of claim 14, wherein the hardware processor corrects the second distance to a distance corresponding to a case in which the print disallowed user approaches the print apparatus so as to avoid an obstacle provided near the print apparatus, in accordance with information relating to the obstacle.

24. The non-transitory computer-readable recording medium of claim 14, wherein in case that a dead angle range is caused in a detection area of the second detector, when the print disallowed user who satisfies a condition in which the second distance is not more than the danger distance is not detected at a timing at which the first distance is not more than the print start distance, the hardware processor instructs the print unit to wait for the print based on the print job until a predetermined time elapses, and
only in case that the print disallowed user is not detected by the second detection unit until the predetermined time elapses, the hardware processor instructs the print unit to start the print based on the print job.

25. The non-transitory computer-readable recording medium of claim 14, wherein the danger distance is a distance from an outer edge of a danger area which is set around the print apparatus, to the print apparatus, and
the hardware processor changes the danger distance by changing the danger area according to the first distance, and the hardware processor compares the danger distance with the second distance by judging whether the print disallowed user exists in the danger area.

26. A non-transitory computer-readable recording medium in which a program is stored, wherein the program causes a hardware processor of a print apparatus to:
obtain a print job set by a print allowed user;
store the obtained print job in a memory of the print apparatus;
instruct a print unit of the print apparatus to execute a print based on the print job;
instruct a first detector of the print apparatus to detect the print allowed user around the print apparatus;
instruct a second detector of the print apparatus to detect a print disallowed user who is different from the print allowed user around the print apparatus;
change a danger area which is set around the print apparatus, according to a distance from the print apparatus to the print allowed user detected by the first detector; and
instruct the print unit to start the print based on the print job on condition that the print disallowed user does not exist in the danger area when the print allowed user exists in a predetermined print start area which is set around the print apparatus.

* * * * *